United States Patent
Edwards et al.

(10) Patent No.: US 7,483,618 B1
(45) Date of Patent: Jan. 27, 2009

(54) AUTOMATIC EDITING OF A VISUAL RECORDING TO ELIMINATE CONTENT OF UNACCEPTABLY LOW QUALITY AND/OR VERY LITTLE OR NO INTEREST

(75) Inventors: Jeffrey L. Edwards, Fredericksburg, VA (US); Subutai Ahmad, Palo Alto, CA (US)

(73) Assignee: YesVideo, Inc., Santa Clara, CA (US)

( * ) Notice: Subject to any disclaimer, the term of this patent is extended or adjusted under 35 U.S.C. 154(b) by 739 days.

(21) Appl. No.: 10/729,433

(22) Filed: Dec. 4, 2003

(51) Int. Cl.
*H04N 5/93* (2006.01)
*H04N 9/00* (2006.01)
*G11B 27/00* (2006.01)

(52) U.S. Cl. .............................. 386/52; 386/4; 386/55

(58) Field of Classification Search .............. 386/52, 386/55, 4; 360/13; 369/83
See application file for complete search history.

(56) References Cited

U.S. PATENT DOCUMENTS

| | | | |
|---|---|---|---|
| 5,576,950 A | 11/1996 | Tonomura et al. | 364/514 |
| 5,613,032 A | 3/1997 | Cruz et al. | 386/69 |
| 5,625,570 A | 4/1997 | Vizireanu et al. | 354/514 |
| 5,956,026 A | 9/1999 | Ratakonda | 345/328 |
| 6,067,126 A | 5/2000 | Alexander | 348/738 |
| 6,100,941 A * | 8/2000 | Dimitrova et al. | 348/700 |
| 6,160,950 A * | 12/2000 | Shimazaki et al. | 386/46 |
| 6,201,924 B1 * | 3/2001 | Crane et al. | 386/52 |
| 6,496,228 B1 | 12/2002 | McGee et al. | 348/700 |
| 6,549,643 B1 | 4/2003 | Toklu et al. | 382/107 |
| 6,571,054 B1 | 5/2003 | Tonomura et al. | 386/95 |
| 6,636,238 B1 | 10/2003 | Amir et al. | 345/730 |
| 6,681,395 B1 * | 1/2004 | Nishi | 725/45 |
| 6,751,776 B1 | 6/2004 | Gong | 715/500.1 |
| 6,956,904 B2 * | 10/2005 | Cabasson et al. | 375/240.26 |
| 7,047,494 B2 | 5/2006 | Wu et al. | 715/723 |
| 7,127,120 B2 * | 10/2006 | Hua et al. | 385/254 |
| 2002/0130976 A1 | 9/2002 | Gutta et al. | 346/700 |
| 2002/0163533 A1 | 11/2002 | Trovato et al. | 345/728 |
| 2003/0160944 A1 | 8/2003 | Foote et al. | 352/1 |
| 2003/0187919 A1 * | 10/2003 | Nakamura et al. | 709/203 |
| 2004/0085340 A1 * | 5/2004 | Dimitrova et al. | 345/723 |

OTHER PUBLICATIONS

"Creating Music Videos using Automatic Media Analysis," J. Foote, M. Cooper and A. Girgensohn, Proceedings of the Tenth ACM International Conference on Multimedia, pp. 553-560, 2002.

"muvee Technologies launches muvee autoProducer Cobalt," Press release, Apr. 3, 2002.

"muvee Technologies launches muvee autoProducer—the world's only smart automatic video editing software," Press release, Oct. 29, 2001.

* cited by examiner

*Primary Examiner*—Thai Tran
*Assistant Examiner*—Daquan Zhao
(74) *Attorney, Agent, or Firm*—David R. Graham

(57) ABSTRACT

A visual recording can be automatically edited in a manner that creates a summary of the visual recording in which only content that is of unacceptably low quality and/or very little or no interest is eliminated, thereby enabling the original unsummarized visual recording to be discarded if desired. Additionally, a summary of a visual recording can be automatically produced in accordance with a format template that imposes a certain overall style to the visual recording summary. Further, a viewer of a visual recording can be enabled to provide input which can affect the visual recording content included in an automatically generated summary of the visual recording.

44 Claims, 4 Drawing Sheets

```
1    <formattemplate>
2      <videotype name = "television" />
3      <musicfile name="abba.mp3" />
4      <rules durationrule="getfrommusic" minqualitythreshold="0.2"
5        minpixeldifference="0.3" maximagesaturation=" 0.75" />
6      <transition name="fadeup" />
7      <titlescene duration="5.0" name="title.jpg" />
8      <transition name="crossfade" />
9    - <loop>
10       <scene duration="4.00" />
11       <transition name="crossfade" />
12       <scene duration="5.00" />
13       <transition name="crossfade" />
14       <scene duration="2.00" />
15       <transition name="cut" />
16       <scene duration="2.00" />
17       <transition name="cut" />
18       <scene duration="5.00" />
19       <transition name="crossfade" />
20       <scene duration="6.00" repeat="okonce" minqualitythreshold="0.5" />
21       <transition name="cut" />
22       <scene name="animation1.mpg" />
23       <transition name="cut" />
24     </loop>
25     <transition name="crossfade" />
26     <titlescene name="end.jpg" />
27     <transition name="fadetoblack" />
28   </formattemplate>
```

FIG. 2

AUTOMATIC EDITING OF A VISUAL RECORDING TO ELIMINATE CONTENT OF UNACCEPTABLY LOW QUALITY AND/OR VERY LITTLE OR NO INTEREST

BACKGROUND OF THE INVENTION

1. Field of the Invention

This invention relates to editing a visual recording and, in particular, to automatically editing a visual recording to eliminate content that is of unacceptably low quality and/or very little or no interest, automatically summarizing a visual recording in accordance with a format template that imposes a certain overall style to the visual recording summary, and enabling a viewer of a visual recording to provide input which can affect the visual recording content included in an automatically generated summary of the visual recording.

2. Related Art

There are a large number of products aimed at helping people interact with (e.g., view, digitize, edit, organize, share) their home video (or other multimedia content) using a personal computer (e.g., desktop computer, laptop computer). However, those computer-based products are typically very labor intensive and require a significant amount of time to manipulate the video into the desired final form.

For example, one common way in which people desire to interact with home video is to select desirable segments of a video recording and create a new video recording that is shorter in duration than the original video recording, i.e., create a summary of an original video recording. This may be done, for instance, to produce a "highlights" video recording that includes segments of the original video recording that are of particular interest. Sometimes audio content (such as music) is combined with the video recording summary to make viewing of the video recording summary more enjoyable. However, existing computer-based products for facilitating the creation of a video recording summary do not enable automatic creation of a high quality video recording summary, thus making creation of a video recording summary require more time and effort than is desirable.

SUMMARY OF THE INVENTION

The invention can enable automatic generation of a high quality summary of a lengthy visual recording (e.g., consumer video footage). The output produced by the invention is a close approximation to what a consumer would generate if they spent several hours painstakingly hand-editing a digitized visual recording. In particular, the invention can be used to automatically edit a visual recording in a manner that creates a summary of the visual recording in which only content that is of unacceptably low quality and/or very little or no interest is eliminated, thereby enabling the original unsummarized visual recording to be discarded if desired. The invention can also be used to automatically produce a summary of a visual recording in accordance with a format template that imposes a certain overall style to the visual recording summary. The invention can also be implemented to enable a viewer of a visual recording to provide input which can affect the visual recording content included in an automatically generated summary of the visual recording. The invention can be implemented as a method in accordance with the description of the invention herein, a system or apparatus for performing such a method, and/or a computer program including instructions and/or data for performing such a method.

In one embodiment of the invention, a visual recording stored on a data storage medium can be edited by selecting one or more clips of the visual recording to be included in a summary of the visual recording, based on an evaluation of data regarding the content of the visual recording and/or data regarding the manner in which the visual recording was obtained (the evaluation of data and/or the selection of clip(s) being performed, at least in part, automatically), and discarding parts of the visual recording not included in the visual recording summary so that the discarded parts of the visual recording are no longer stored on a data storage medium. A particular advantage of this embodiment of the invention is that the original unsummarized visual recording can be discarded with little or no loss of visual recording content of interest. The summary of the visual recording requires less data storage capacity to store, can be viewed more quickly and can provide a more enjoyable viewing experience (since content of little or no interest has been discarded) than the original unsummarized visual recording.

In another embodiment of the invention, a visual recording summary can be created by: 1) evaluating data regarding the content of the visual recording and/or data regarding the manner in which the visual recording was obtained; 2) specifying the manner of creation and/or display of the visual recording summary in accordance with a format template; and 3) selecting one or more clips of the visual recording to be included in the summary of the visual recording, based on the evaluation and the format template (the evaluation of data and/or the selection of clip(s) being performed, at least in part, automatically. A format template imposes a certain overall style to a visual recording summary and can be based on a well-established editing grammar that codifies good practices and techniques of visual recording editing. The use of a format template can advantageously enable automatic creation of a visual recording summary making use of standard editing tricks (such as pacing) to make the display of the visual recording summary more interesting.

In yet another embodiment of the invention, a visual recording summary can be created by: 1) evaluating data regarding the content of a visual recording and/or data regarding the manner in which the visual recording was obtained; 2) modifying the result of the evaluation in accordance with an input provided by a viewer of the visual recording regarding the desirability of a part of the visual recording; and 3) selecting one or more clips of the visual recording to be included in the summary of the visual recording, based on the modified result of the evaluation. As indicated above, the invention can enable creation of a summary of a visual recording (automatically, at least in part) that retains all visual recording content of interest, so that the original unsummarized visual recording can be discarded (and, with it, the visual recording content that is not part of the visual recording summary). In such cases, it is desirable to allow one or more people with an interest in the content of the visual recording (e.g., the owner(s) df the visual recording) to have input into creation of the summary of the visual recording (particularly since some or all of creation of the visual recording summary occurs automatically, i.e., without human intervention), since the consequences of discarding the original unsummarized visual recording may be severe (i.e., if desirable content is among that discarded, it cannot be retrieved). This embodiment of the invention can advantageously meet that need: a viewer (or viewers) of the visual recording (and, in particular, a person or persons with an interest in the content of the visual recording, such as the owner(s) of the visual recording) is enabled to provide significant input to the manner in which a visual recording summary is created. Thus, the viewer(s) can take action which can tend to minimize the possibility that desirable content is among that discarded.

BRIEF DESCRIPTION OF THE DRAWINGS

FIG. 2 illustrates a format template that can be used in creating a visual recording summary according to the invention.

DETAILED DESCRIPTION OF THE INVENTION

Figure 1:
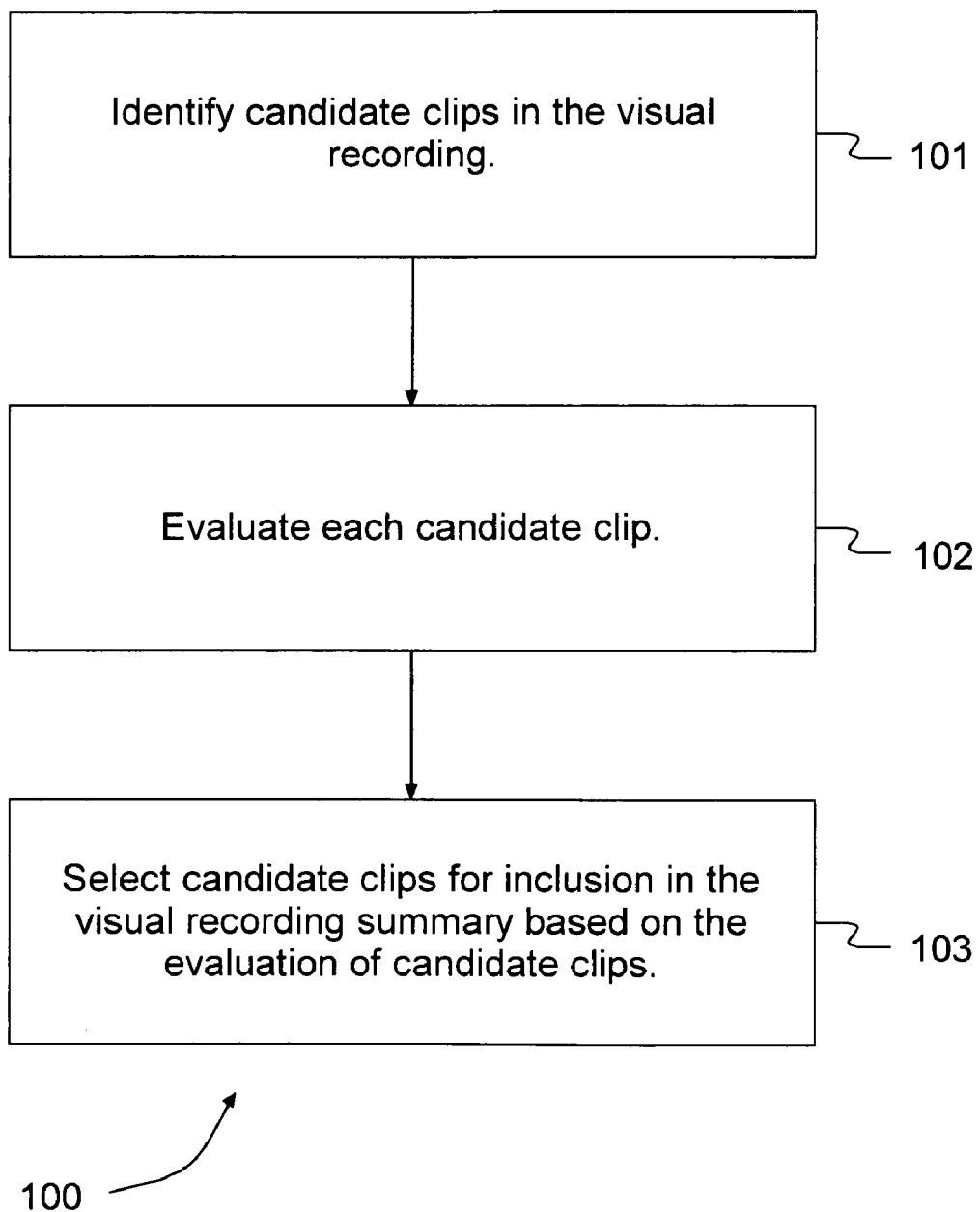
FIG. 1 is a flow chart of a method, according to an embodiment of the invention, for creating a summary of a visual recording.

As indicated above, it can be desirable to create a summary of a home video (or other visual recording). (Herein, a "visual recording" includes a series of visual images acquired at a regular interval by a visual data acquisition apparatus such as a video camera and representing visual content that occurs over a period of time. A visual recording may or may not also include audio content.) For instance, it may be desired to create a visual recording summary including only segments of the original, full-length visual recording that are deemed to be of particular interest, i.e., create a "highlights" visual recording. (A segment of a visual recording is also often referred to herein as a "clip.") Commonly owned, co-pending U.S. patent application Ser. No. 10/448,255, entitled "Summarization of a Visual Recording," filed on May 28, 2003, by Subutai Ahmad et al. describes creation of a visual recording summary of this type. However, it can also be desirable to edit a visual recording to produce a visual recording summary of another type. For example, it may be desired to eliminate parts of the visual recording that are deemed to be of unacceptably low quality and/or very little or no interest, such as parts of the visual recording including blurriness, aliasing effects, poor contrast, poor exposure and/or little or no content (e.g., blank images). Creation of a visual recording summary of that type can require a different approach than that used to create a "highlights" visual recording summary. In particular, if it is desired to permanently discard parts of the visual recording determined to be of unacceptably low quality and/or very little or no interest, it is of the utmost importance to ensure that such determinations are accurate.

The invention can enable automatic generation of a high quality summary of a lengthy visual recording (e.g., consumer video footage). The output produced by the invention is a close approximation to what a consumer would generate if they spent several hours painstakingly hand-editing a digitized visual recording. In particular, the invention can be used to automatically edit a visual recording in a manner that creates a summary of the visual recording in which only content that is of unacceptably low quality and/or very little or no interest (e.g., excessively blurry or saturated visual images, static images, loss-of-video-signal images), is eliminated, thereby enabling the original unsummarized visual recording to be discarded if desired. Typically, this will result in a visual recording summary that includes most of the content of the original unsummarized visual recording, i.e., the duration of the visual recording summary is greater than 50% (e.g., 75% or more) of the duration of the original unsummarized visual recording. The exact amount of the visual recording that is retained in the visual recording summary depends on the quality of the visual recording, and may further depend on a specified duration of the visual recording summary. The invention can also be used to automatically produce a summary of a visual recording in accordance with a format template that imposes a certain overall style to the visual recording summary. The invention can also be implemented to enable a viewer of a visual recording to provide input which can affect the visual recording content included in an automatically generated summary of the visual recording. The invention can be implemented as a method in accordance with the description of the invention herein, a system or apparatus for performing such a method, and/or a computer program including instructions and/or data for performing such a method. The invention can be used to edit any type of visual recording to produce a summary of the visual recording. Visual recordings with which the invention can be used can be stored on any type of data storage medium or media, e.g., analog or digital videotape, DVD, CD, 8 mm film (such as Super 8 mm film), reel-to-reel tape.

According to one aspect of the invention, a visual recording stored on a data storage medium can be edited by selecting one or more clips of the visual recording to be included in a summary of the visual recording, based on an evaluation of data regarding the content of the visual recording and/or data regarding the manner in which the visual recording was obtained (the evaluation of data and/or the selection of clip(s) being performed, at least in part, automatically), and discarding parts of the visual recording not included in the visual recording summary so that the discarded parts of the visual recording are no longer stored on a data storage medium. A particular advantage of this aspect of the invention is that the original unsummarized visual recording can be discarded with little or no loss of visual recording content of interest. The summary of the visual recording requires less data storage capacity to store, can be viewed more quickly and can provide a more enjoyable viewing experience (since content of little or no interest has been discarded) than the original unsummarized visual recording.

According to another aspect of the invention, a visual recording summary can be created by: 1) evaluating data regarding the content of the visual recording and/or data regarding the manner in which the visual recording was obtained; 2) specifying the manner of creation and/or display of the visual recording summary in accordance with a format template; and 3) selecting one or more clips of the visual recording to be included in the summary of the visual recording, based on the evaluation and the format template (the evaluation of data and/or the selection of clip(s) being performed, at least in part, automatically). As discussed in more detail below, a format template imposes a certain overall style to a visual recording summary and can be based on a well-established editing grammar that codifies good practices and techniques of visual recording editing. The use of a format template can advantageously enable automatic creation of a visual recording summary making use of standard editing tricks (such as pacing) to make the display of the visual recording summary more interesting.

According to yet another aspect of the invention, a visual recording summary can be created by: 1) evaluating data regarding the content of a visual recording and/or data regarding the manner in which the visual recording was obtained; 2) modifying the result of the evaluation in accordance with an input provided by a viewer of the visual recording regarding the desirability of a part of the visual recording; and 3) selecting one or more clips of the visual recording to be included in the summary of the visual recording, based on the modified result of the evaluation. As indicated above, the invention can enable creation of a summary of a visual recording (automatically, at least in part) that retains all visual recording content of interest, so that the original unsummarized visual recording can be discarded (and, with it, the visual recording content that is not part of the visual recording summary). In such cases, it is desirable to allow one or more people with an interest in the content of the visual recording (e.g., the owner (s) of the visual recording) to have input into creation of the summary of the visual recording (particularly since some or all of creation of the visual recording summary occurs automatically, i.e., without human intervention), since the consequences of discarding the original unsummarized visual recording may be severe (i.e., if desirable content is among that discarded, it cannot be retrieved). This aspect of the invention can advantageously meet that need: a viewer (or viewers) of the visual recording (and, in particular, a person or persons with an interest in the content of the visual recording, such as the owner(s) of the visual recording) is enabled to provide significant input to the manner in which a visual recording summary is created. Thus, the viewer(s) can take action which can tend to minimize the possibility that desirable content is among that discarded.

The invention can make use of, and can extend, systems, apparatus, methods and/or computer programs described in the following commonly owned, co-pending U.S. patent applications: 1) U.S. patent application Ser. No. 09/792,280, entitled "Video Processing System Including Advanced Scene Break Detection Methods for Fades, Dissolves and Flashes," filed on Feb. 23, 2001, by Michele Covell et al.; 2) U.S. patent application Ser. No. 10/198,602, entitled "Automatic Selection of a Visual Image or Images from a Collection of Visual Images, Based on an Evaluation of the Quality of the Visual Images," filed on Jul. 17, 2002, by Michele Covell et al.; 3) U.S. patent application Ser. No. 10/226,668, entitled "Creation of Slideshow Based on Characteristic of Audio Content Used to Produce Accompanying Audio Display," filed on Aug. 21, 2002, by Subutai Ahmad et al.; and 4) U.S. patent application Ser. No. 10/448,255, entitled "Summarization of a Visual Recording," filed on May 28, 2003, by Subutai Ahmad et al. The disclosures of each of those applications are hereby incorporated by reference herein. Particular ways in which aspects of the inventions described in those applications can be used with the invention of the instant application are identified below.

FIG. 1 is a flow chart of a method 100, according to an embodiment of the invention, for creating a summary of a visual recording. Ways in which the steps of the method 100 can be implemented are described in more detail below. The method 100 can advantageously be implemented so that the creation of the visual recording summary is performed automatically, entirely or in part. For example, some or all of the method 100 can be automatically performed by operation of a computational device in accordance with appropriate computer program(s).

In step 101, candidate clips are identified in the visual recording. (A "clip" is any temporally continuous series of multiple visual images in chronological order; a clip is sometimes also referred to herein as a "segment." A clip may or may not include audio content. A "candidate clip" is a clip that is evaluated for possible inclusion in a visual recording summary.) The candidate clips can be, for example, short overlapping (and/or adjacent) clips from throughout the visual recording, as explained in more detail below. Visual recording data (and, if applicable, corresponding audio recording data) representing the candidate clips can be extracted from the visual recording into one or more new data files at the time candidate clips are identified, or indices identifying the first and last visual recording frames of each candidate clip can be stored at the time candidate clips are identified and the indices used at a later time to extract the visual recording data (and, if applicable, corresponding audio recording data) representing the candidate clips.

In step 102, each candidate clip is evaluated. The evaluation of a candidate clip is performed in a manner intended to indicate the quality of the clip (and, thus, the desirability of including the candidate clip in the summary of the visual recording). The invention can be implemented so that a score (quality score) is computed for each candidate clip based on the evaluation. The evaluation of a candidate clip can be based on a single criterion or multiple criteria. In the latter case, a score for each candidate clip can be determined as a combination of multiple sub-scores computed for that clip. The evaluation of a candidate clip can include evaluation of the visual recording data of the candidate clip, evaluation of the audio recording data of the candidate clip and/or evaluation of one or more other characteristics of the candidate clip. For example, sub-scores can be computed for each candidate clip that measure the desirability of the candidate clip with respect to several different properties of the candidate clip, such as stability and sharpness of the visual images in the candidate clip, and the score for the candidate clip computed as a weighted average of those sub-scores. Criteria that can be used in computing a score or sub-score for candidate clips and the manner of combining candidate clip sub-scores to produce an overall score are described in more detail below.

In step 103, candidate clips are selected for inclusion in the visual recording summary based on the evaluations of candidate clips in step 102. For example, the candidate clips can be ranked in increasing or decreasing order of score and clips having the highest (or lowest) scores selected for inclusion in the visual recording summary. The selected clips comprise less than all of the visual recording, i.e., the selected clips constitute a summary of the visual recording. The selection of clips can be based on metadata (in particular, visual image metadata) produced prior to, or as part of, the method 100.

The invention makes use of two types of data to enable creation of a visual recording summary: content data (e.g., visual recording data, audio data) and metadata. Herein, "metadata" is used as known in the art to refer to data that represents information about the content data. Examples of metadata and ways in which metadata can be used in the invention are described in more detail below. Metadata can be created manually (e.g., specification by the creator of a visual recording of a title for, or a description of, the visual recording). Metadata can also be determined automatically from a set of content data (e.g., automatic evaluation of the quality of a visual image, automatic determination of scene breaks and/or keyframes in a visual recording, automatic identification of beats in music). As described in more detail elsewhere herein, the invention can be embodied so that a visual recording is analyzed to compute one or more statistical properties for each visual image of the visual recording. Such analysis, as well as the production of other metadata, can be performed as part of the invention, or the invention can make use of metadata produced by a method, system and/or computer program that is not part of the invention. For example, in a more particular embodiment of the method 100 described above with respect to FIG. 1, a step of analyzing a visual recording to produce metadata regarding the visual recording (e.g., compute one or more statistical properties for each of the visual images of the visual recording) can be performed before identification of candidate clips in the visual recording in step 101.

The invention creates a visual recording summary using digital content data (e.g., digital visual recording data). Digital visual recording data can be obtained directly using a digital data acquisition device, such as a digital video camera. For example, a user can acquire a visual recording directly in digital form by recording on to miniDV tape, optical disk or a hard drive. Digital visual recording data can also be produced by converting analog visual recording data obtained using an analog data acquisition device, such as an analog video camera, to digital visual recording data using techniques known to those skilled in the art. For example, a user can digitize analog visual recording data and store the digitized visual recording data on one or more digital data storage media such as DVD (s), CD-ROM(s) or a hard drive. A user can do this using existing software program(s) on a conventional computer. There also exist cost-effective services, such as provided by, for example, YesVideo, Inc. of Santa Clara, Calif., for digitizing analog visual recording data and storing the digitized data on a digital data storage medium, e.g., one or more portable data storage media such as one or more DVDs or CDs.

Once clips have been selected for inclusion in a summary of the visual recording, the selected clips can be stored together on one or more data storage media. In accordance with an embodiment of the invention, the clips of the visual recording summary are selected in a manner that eliminates only content that is of unacceptably low quality and/or very little or no interest, thereby enabling the parts of the original unsummarized visual recording that are not included in the visual recording summary to be discarded, i.e., those parts of the original unsummarized visual recording are no longer stored on a data storage medium. Thus, the invention can advantageously reduce the data storage capacity required by a visual recording, as well as make viewing of a visual recording less time consuming and more enjoyable. However, in some embodiments of the invention, the invention can be implemented so that none of the original unsummarized visual recording is discarded and/or so that the clips of the visual recording summary are not stored on data storage medi(a) (e.g., so that the visual recording summary is displayed immediately or shortly after creation). Storing the clips of the visual recording summary and/or discarding parts of the original unsummarized visual recording that are not included in the visual recording summary can be performed as part of the invention, e.g., in more particular embodiments of the method 100 described above with respect to FIG. 1, one or both of those steps (storing, discarding) can be performed after selection of candidate clips for inclusion in the visual recording summary in step 103.

Typically, the visual recording summary will be displayed, either as the visual recording summary is created, immediately after the entire visual recording summary is created, or at some later time. The clips of the visual recording summary can be extracted (and, typically, stored) from the original visual recording and arranged in order for eventual display, or indices identifying the locations of the clips of the visual recording summary within the original visual recording can be used during display of the visual recording summary to extract each clip at the time of display of that clip. In general, clips selected for inclusion in a visual recording summary can be displayed in any order; however, it is anticipated that, typically, the clips selected for inclusion in a visual recording summary will be displayed in chronological order. Display of a visual recording summary can be performed as part of the invention, e.g., in a particular embodiment of the method 100 described above with respect to FIG. 1, the display of the visual recording can be performed after selection of candidate clips for inclusion in the visual recording summary in step 103 (display of the visual recording summary can be performed before or after storing the visual recording summary and/or discarding unused parts of the original unsummarized visual recording, if one or both of those steps are performed).

The invention can be implemented so that the duration of the visual recording summary can be specified. If the duration of the visual recording summary is not specified, then all clips meeting specified criteria (e.g., having a quality score of specified magnitude) are included in the visual recording summary. The invention can also be implemented to combine those two approaches: a duration of the visual recording summary is specified, but all clips included in the visual recording summary must also meet specified criteria (e.g., have a quality score of specified magnitude), so that the visual recording summary may be shorter than the specified duration.

The invention can be implemented so that the duration of the visual recording summary can be specified as an absolute duration (e.g., a specified number of hours, minutes and/or seconds), as a percentage of the duration of the original visual recording (e.g., 50% or 75% of the duration of the original visual recording), or as either of those two. The invention can be implemented so that the duration of the visual recording summary can be specified by a user (e.g., the owner or creator of the original visual recording), or so that the duration of the visual recording summary is predetermined as a fixed parameter of, or determined automatically by, a method, system, apparatus or computer program that implements the invention. In the latter case, the invention can be implemented so that the duration of the visual recording summary is determined automatically in accordance with the content of a format template. For example, the duration of the visual recording summary can be determined in accordance with music selection(s) specified in the format template to accompany the visual recording summary (see, e.g., FIG. 2 and the associated description below). A format template can also specify the duration of a visual recording summary by specifying the duration of scenes in the visual recording summary display. A format template can also specify the display of images or clips that are not selected from the visual recording, which may also affect the duration of the visual recording summary (see, e.g., FIG. 2 and the associated description below). In the former case, the invention can be implemented to enable a user to specify the duration of the visual recording summary together with other instructions for producing a visual recording summary. Further, the invention can be implemented so that the user can specify the duration directly (i.e., specify an absolute duration or a percentage of the duration of the original visual recording) or indirectly as a consequence of another specification by the user regarding the visual recording summary. For example, a user can indirectly specify the duration of the visual recording summary via the choice of a music selection or selections to accompany the visual recording summary, the duration of the visual recording summary being equal to the duration of the musical selection(s) when played one or more times. A specification of the duration of a visual recording summary can also result from a combination of choice(s) made by a user and an automatic determination by a method, system, apparatus or computer program that implements the invention. For instance, a user's choice of music selection(s) can be incorporated into an automatic determination of the duration of the visual recording summary (e.g., in accordance with the content of a format template) by a method, system, apparatus or computer program that implements the invention.

The invention can be implemented to enable the look and feel of the visual recording summary to be controlled via the selection of a particular format template. A number of different canned format templates can be provided, each with a different style. For example, a format template can cause a visual recording summary to be slow-paced or fast-paced, to display images in chronological or non-chronological order, and/or to display images repetitively (i.e., multiple times) or non-repetitively (i.e., a single time). Format templates can be based on well-established editing grammars that codify good practices and techniques of visual recording editing, as known to those skilled in the art. Format templates can be constructed using a well-defined data structure that includes data that specifies various aspects of the creation and display of a visual recording summary. For example, a format template can include data that can be used to specify a type of visual recording for which the format template is intended to be used, establish the duration of a visual recording summary, the duration or durations of clips to be included in the visual recording summary, the weight(s) to be assigned to criter(ia) used in evaluating the visual recording to enable selection of clips for inclusion in the visual recording summary, the manner of ordering the display of clips in the visual recording summary, special effects in the display of clips in the visual recording summary (e.g., types of transitions between clips and associated parameters), music selection(s) to accompany the display of clips in the visual recording summary, and the number of times to repeat the display of the clips of a visual recording summary. The use of format templates in implementing the invention is discussed elsewhere herein.

The invention can be implemented so that the evaluation of one or more candidate clips can be modified based on input provided by a viewer of the visual recording (such input is sometimes referred to herein as an "AutoHint"). Any appropriate user interface can be used to enable provision of an AutoHint by a viewer; some exemplary implementations are described in more detail below. An AutoHint is feedback from the viewer indicating that a part of the visual recording is "good" or "bad" (i.e., should be included in, or discarded from, respectively, a visual recording summary produced from the visual recording). The part of the visual recording with which an AutoHint is associated (for convenience, sometimes referred to herein as the "AutoHint part") can be a single visual image or a clip. AutoHint feedback can be used, for example, to modify quality scores determined for candidate clips of a visual recording. The degree of similarity between the AutoHint part and other parts (single visual images or clips) of the visual recording can be determined (as explained in greater detail below). Depending on the degree of similarity between the AutoHint part and another part of the visual recording, the evaluation of the candidate clip including the other part of the visual recording (or included by the other part, if larger than the candidate clip) may be modified or not. For example, this aspect of the invention can be implemented so that the degree of similarity between the AutoHint part and another part of the visual recording can determine whether the AutoHint feedback modifies the evaluation of that other part of the visual recording: if the two parts are sufficiently similar, the evaluation of the other part of the visual recording is modified to be more like that of the AutoHint part, as expressed by the content of the AutoHint feedback; if not, the evaluation of the other part of the visual recording is not modified or is modified to be less like that of the AutoHint part, as expressed by the content of the AutoHint feedback. Or, for example, this aspect of the invention can also be implemented so that the degree of similarity between the AutoHint part and another part of the visual recording determines the degree to which the AutoHint feedback modifies the evaluation of that other part of the visual recording: the greater the similarity or dissimilarity between the AutoHint part and the other part of the visual recording, the more the AutoHint feedback modifies the evaluation of the other part of the visual recording to be more or less, respectively, like that of the AutoHint part, as expressed by the content of the AutoHint feedback; the lesser the similarity or dissimilarity, the less the AutoHint feedback modifies the evaluation of the other part of the visual recording to be more or less, respectively, like that of the AutoHint part, as expressed by the content of the AutoHint feedback.

In step 101 of the method 100 for creating a summary of a visual recording described above, candidate clips are identified in the visual recording. To ensure that all parts of the visual recording can possibly be included in the visual recording summary, the invention can be implemented so that candidate clips are specified such that both the beginning and end of each candidate clip is included within, or is adjacent to, another candidate clip. To increase the likelihood that all content of interest in the visual recording will be included in the visual recording summary, the invention can be implemented so that candidate clips are specified such that candidate clips overlap (i.e., the beginning and/or end of each candidate clip is included within another candidate clip). The use of overlapping candidate clips increases the likelihood that all content of interest will be included in the visual recording summary because the content in the overlapping parts of clips has multiple chances to be included in the visual recording summary, reducing the possibility that interesting content that is part of a clip including otherwise uninteresting content (in particular, a clip that includes mostly uninteresting content) will not be included in the visual recording summary because the contribution of the interesting content to evaluation of the clip is dwarfed by the contribution of the uninteresting content. For example, a clip overlap of 50% can be used, thereby ensuring that each visual image is in at least two clips. A similar benefit could be achieved by cutting the clip duration in half and using no clip overlap.

A duration is established for each candidate clip. The duration(s) of candidate clip(s) can be specified by a user and/or so that the duration(s) of candidate clip(s) are predetermined as a fixed parameter of, or determined automatically by, a method, system, apparatus or computer program that implements the invention. The invention can be implemented so that all candidate clips have the same duration or so that one or more candidate clips have a duration different from that of one or more other candidate clips. For example, the invention can be implemented so that the visual recording is divided into sections, candidate clips defined for each section having a particular duration, the candidate clips of at least one section of the visual recording having a duration different from that of the candidate clips of another section of the visual recording. In such case, the invention can be implemented so that the candidate clip duration for each section is used beginning with candidate clips having a starting or ending point after a first specified time in the visual recording and ending when candidate clips have a starting or ending point after a second specified time in the visual recording. The invention can also be implemented so that, for each point in the visual recording at which a candidate clip is to begin or end, multiple candidate clips are defined, each of different duration (e.g., for each point in a visual recording at which a candidate clip is to begin, candidate clips of 5, 10 and 15 seconds are defined). In such case, the invention can be implemented so that only one of the candidate clips associated with a particular candidate clip beginning or ending point can be selected for inclusion in the visual recording summary (e.g., the candidate clip at that point that is determined to have the highest quality score) or so that any or all of such candidate clips can be selected for inclusion in the visual recording summary (if the candidate clip(s) meet other criter(ia) for selection). The foregoing two implementations can also be combined: the visual recording can be divided into sections, multiple candidate clips of a specified set of durations for that section being defined for each candidate clip beginning or ending point in the section, the specified set of durations for candidate clips of at least one section of the visual recording being different from those of another section of the visual recording.

The invention can be implemented so that the duration(s) of candidate clips depend on a format template (and, in particular, an editing grammar upon which the format template is based). As discussed above, a format template imposes a certain overall style to a visual recording summary. For example, a format template can impose a slow, peaceful style to a visual recording summary, in which case candidate clips may be specified to have a relatively long duration (e.g., 10 seconds or more). Or, a format template can impose a fast-paced style to a visual recording summary, in which case candidate clips may be specified to have a relatively short duration (e.g., 3 seconds or less).

The invention can be implemented so that the duration(s) of candidate clips depend on the beats in music that is to accompany the display of the visual recording summary. For example, if the music is fast-paced (i.e., a high beat frequency and, correspondingly, a short beat interval), candidate clips may be specified to have a relatively short duration, while if the music is slow-paced (i.e., a low beat frequency and, correspondingly, a long beat interval), candidate clips may be specified to have a relatively long duration. The beat interval can vary throughout a selection of music: in that case, the duration(s) of candidate clips can vary as well, in accordance with the varying beat interval. If not otherwise provided, beats and beat intervals in music can be determined using known techniques, such as, for example, techniques described in the above-referenced U.S. patent application Ser. No. 10/448, 255. Duration(s) of candidate clips based on beats in music can also be determined as described in U.S. patent application Ser. No. 10/448,255. For example, the duration of a candidate clip can be the beat interval between two specified beats (e.g., two major beats). The duration of a candidate clip can also be a multiple of a beat interval or a sum of successive beat intervals.

Candidate clips can be identified in a visual recording as follows. A first candidate clip in the visual recording is defined to have a beginning at the first frame of the visual recording and an end at the frame of the visual recording that produces a clip duration that is specified for that candidate clip. Successive candidate clips can then be defined by establishing the beginning of the candidate clip as the frame that is offset by a specified number of frames from the frame at the beginning of the previous candidate clip, and establishing the end of the candidate clip as the frame that produces a clip duration that is specified for that candidate clip.

The invention can be implemented so that all candidate clip offsets are the same or so that one or more candidate clip offsets is different from one or more other candidate clip offsets. For example, as with candidate clip durations, the visual recording can be divided into sections, candidate clips defined for each section having a particular offset from a previous candidate clip, the candidate clips of at least one section of the visual recording having an offset different from that of the candidate clips of another section of the visual recording. The candidate clip offset(s) can be specified by a user or so that the candidate clip offset(s) are predetermined as a fixed parameter of, or determined automatically by, a method, system, apparatus or computer program that implements the invention. Together with candidate clip duration(s), candidate clip offset(s) determine the amount of overlap, if any, of candidate clips. The invention can be implemented so that each candidate clip offset spans a duration of time that is less than or equal to the duration of the immediately prior candidate clip (i.e., so that all candidate clips overlap, or are adjacent to, one or more other candidate clips), so that there will not be any sections of the visual recording that cannot possibly be included in the visual recording summary. In general, decreasing the candidate clip offset increases the degree of overlap of candidate clips. Further, increasing the degree of overlap of candidate clips can increase the likelihood that all content of interest will be included in the visual recording summary because relatively more content has multiple chances to be included in the visual recording summary. However, increasing the degree of overlap of candidate clips increases the number of candidate clips and, consequently, the time and computing resources required to evaluate candidate clips and produce the visual recording summary. The amount of candidate clip offset can be chosen in view of the above-described tradeoff, e.g., if time and computational resources are not a concern, a relatively small candidate clip offset can be used.

A visual recording typically includes multiple scenes. (A "scene" is a visual recording segment including visual images that represent related content.) The invention can be implemented so that a candidate clip cannot span a scene break (i.e., a location in a visual recording at which one scene ends and another scene begins); each clip must be contained entirely within a scene. In such an implementation of the invention, the visual recording is evaluated to identify the locations of scene breaks (cuts) in the visual recording, and a list is created of those locations, which is consulted as candidate clips are identified to ensure that no candidate clip spans a location in the list. The invention can be further implemented to evaluate the visual recording to identify the locations of fades and dissolves in the visual recording, in addition to standard scene breaks (cuts), and the locations of the fades and dissolves added to the list of locations of scene breaks, thus preventing candidate clips from spanning a fade or dissolve as well. Implementing the invention in this manner prevents the creation of a candidate clip that spans two different, disparate scenes—the viewing of which can produce a flashing effect that may be jarring to a viewer—or otherwise spans a transition in the visual recording that may be jarring to a viewer.

Standard scene breaks (cuts), fades and dissolves can be identified in a visual recording using any appropriate technique or techniques, a variety of which are known to those skilled in the art. For example, cuts, fades and dissolves can be identified in a visual recording using a method or methods as described in the above-referenced U.S. patent application Ser. No. 09/792,280. Or, for example, cuts, fades and dissolves can be identified in a visual recording using a method or methods as described in commonly owned, co-pending U.S. patent application Ser. No. 09/595,615, entitled "Video Processing System," filed on Jun. 16, 2000, the disclosure of which is hereby incorporated by reference herein.

When the invention is implemented so that a candidate clip cannot span a scene break (or fade or dissolve), candidate clips can be determined for each scene in the visual recording as follows. A first candidate clip in the scene is defined to have a beginning at the first visual recording frame of the scene and an end at the frame that produces a clip duration that is specified for that candidate clip. Successive candidate clips are then defined, as described above, by establishing the beginning of the candidate clip as the frame that is offset by a specified number of frames from the frame at the beginning of the previous candidate clip, and establishing the end of the candidate clip as the frame that produces a clip duration that is specified for that candidate clip. Successive candidate clips are defined in this manner until a new prospective candidate clip would extend beyond the end of the scene (that clip is not defined as a candidate clip).

In step 102 of the method 100 for creating a summary of a visual recording described above, each candidate clip is evaluated in a manner intended to indicate the quality of the clip. As indicated above, the evaluation of the quality of a candidate clip can be based on a single criterion or multiple criteria. Of the criteria discussed below, the image stability criterion, image saturation (including color saturation) criterion, edge sharpness criterion, image contrast criterion and garbage content criterion are particularly useful in creating visual recording summaries according to the invention, e.g., visual recording summaries in which only content that is of unacceptably low quality and/or very little or no interest is eliminated, thereby enabling the original unsummarized visual recording to be discarded if desired. When the evaluation is based on multiple criteria, it can be advantageous to choose criteria such that some or all of the criteria are independent of other criteria, since the use of independent criteria can increase the reliability of the evaluation of the quality of the clip. For example, of the criteria discussed below, the image stability criterion is typically independent of each of the image saturation criterion, edge sharpness criterion and image contrast criterion. The image saturation criterion is typically independent of the edge sharpness criterion. The audio content criterion is typically independent of all of the other criteria.

As also indicated above, a score can be computed for each candidate clip based on the evaluation of the quality of the clip and, when the evaluation of the quality of candidate clips is based on multiple criteria, the score can be a combination of multiple sub-scores each determined for the clip based on one of the multiple criteria. The invention can be implemented so that scores and, if applicable, sub-scores are represented as single values between 0 and 1, inclusive; however, it can readily be understood that scores and sub-scores can be represented using other magnitude ranges. Further, the invention can be implemented so that higher scores and sub-scores are preferred over lower scores and sub-scores (i.e., a high score corresponds to a high quality candidate clip, while a low score corresponds to a low quality candidate clip), or vice versa. The invention is frequently described below as implemented in the former manner. In such case, for example, a score or sub-score of 0 can be interpreted to mean that the candidate clip should under no circumstances be selected to form part of the visual recording summary, while a score or sub-score of 1 can be interpreted to mean that the candidate clip must be selected to form part of the visual recording summary. Following is a description of various criteria that can be used in evaluating the quality of a candidate clip (alone or together in any desired combination), how a score or sub-score can be determined for a candidate clip based on those criter(ia), and how sub-scores can be combined to produce an overall score for a candidate clip.

One criterion that can be used to evaluate the quality of a candidate clip is the degree of motion that occurs during the clip (the "image stability" criterion). A candidate clip that contains rapid panning (and, therefore, eye-jarring) motion is penalized (e.g., given a low score), while a candidate clip that contains no panning or gentle panning is not (e.g., given a high score). Detection of rapid panning can be based on the percentage of motion pixels that are present in frames of the candidate clip. A motion pixel can be defined as a pixel in a current frame that differs in luminance from the corresponding pixel in the previous frame (either higher or lower) by greater than a specified threshold. (Below, whenever a quantity is indicated to be greater than or less than a specified magnitude, it is to be understood that the invention can also be implemented so that the quantity is greater than or equal to, or less than or equal to, the specified magnitude. The converse is also true, e.g., greater than or equal to can be implemented as greater than.) In one implementation, in accordance with the invention, of evaluation of the quality of a candidate clip using the image stability criterion, each frame of a candidate clip is first classified as "panning" or "not panning" based on whether the percentage of motion pixels in the frame is greater (panning) or less (not panning) than a specified threshold. (If the percentage of motion pixels is equal to the specified threshold, the frame can be classified as "panning" or "not panning," depending on the particular implementation of the invention; either implementation is acceptable.) Next, a "panning frame percentage," PFP, is determined that represents the percentage of the candidate clip's frames that were labeled "panning." An image stability score, S_STAB, is then mapped to the PFP of the clip as follows, where MAX_PFP is a first specified threshold percentage of panning frames above which a clip is deemed to have minimum quality (according to this criterion) and TARGET_PFP is a second specified threshold percentage of panning frames below which a clip is deemed to have maximum quality (according to this criterion):

IF PFP>MAX_PFP
S_STAB=0.0
ELSE IF PFP>TARGET_PFP
S_STAB=1.0−(PFP−TARGET_PFP)/(MAX_PFP−TARGET_PFP)
ELSE S_STAB=1.0

Another criterion that can be used to evaluate the quality of a candidate clip is the amount of light in the visual images of the clip (the "image saturation" criterion). A candidate clip that includes a large number of visual images that are highly saturated (i.e., that are very dark or very bright) is penalized (e.g., given a low score), while a candidate clip that includes a large number of visual images that have a good dynamic range of luminance is not (e.g., given a high score). Whether a visual image is very dark (underexposed) or very bright (overexposed) can be determined by ascertaining the amount of energy in the image: the former will exhibit too little energy, while the latter will exhibit too much. In one implementation, in accordance with the invention, of evaluation of the quality of a candidate clip using the image saturation criterion, for each frame of a candidate clip the percentage of high-energy pixels in the frame, F_hi, and the percentage of low-energy pixels in the frame, F_lo, is determined. The energy of a pixel can be indicated by the grayscale Value of the pixel: a high energy pixel has a grayscale value greater than a specified magnitude, while a low energy pixel has a grayscale value less than a specified magnitude. A saturation measure, SM, is determined for each frame based on the percentages of high-energy and low-energy pixels in the frame, as follows: SM=F_lo+F_hi. If the saturation measure, SM, of a frame is greater than a specified threshold, the frame is identified as a "saturated frame." A "saturation percentage," SP, is determined that represents the percentage of the candidate clip's frames that were labeled "saturated frames." An image saturation score, S_SAT, is then mapped to the SP of the clip as follows, where MAX_SP is a first specified threshold saturation percentage above which a clip is deemed to have minimum quality (according to this criterion) and TARGET_SP is a second specified threshold saturation percentage below or equal to which a clip is deemed to have maximum quality (according to this criterion):

```
IF SP>MAX_SP
  S_SAT=0.0
ELSE IF SP>TARGET_SP
  S_SAT=1-(SP-TARGET_SP)/(MAX_SP-TARGET_SP
ELSE
  S_SAT=1.0
```

Another criterion that can be used to evaluate the quality of a candidate clip is the degree of "edginess" (i.e., the presence of sharp spatial edges) in the visual images of the candidate clip (the "edge sharpness" criterion). A candidate clip that includes visual images having few or no sharp edges is penalized (e.g., given a low score), while a candidate clip that includes visual images having many sharp edges is not (e.g., given a high score). As the degree of "edginess" within a visual image increases, the likelihood that the visual image is blurry (due to, for example, poor focus or to large over- or under-exposed parts of the visual image) decreases, i.e., as the degree of "edginess" within a visual image increases, the quality (desirability) of the visual image increases. The degree of "edginess" within a visual image can be evaluated by, for example, evaluating the pixel count from a Sobel edge operator (e.g., identifying the percentage of edge pixels in the visual image and determining whether the percentage of edge pixels in the visual image is greater than a specified percentage). The degree of "edginess" within a visual image can also be evaluated by, for example, evaluating the average first-order spatial correlation coefficient for the visual image. The former tends to give a better measure of sharp edges, while the latter, although providing a less exact measure of "edginess," gives a more general characterization that can be useful in other processing of visual images of the visual recording. Evaluating the degree of "edginess" within a visual image is described in detail in the above-referenced U.S. patent application Ser. No. 10/198,602. Depending on the degree of edginess identified within a visual image, the image can be identified as a sharp image or a blurry image. The percentage of visual images in the candidate clip that are sharp images (or, equivalently, the percentage of blurry images) can be calculated and a score for the candidate clip determined as a function of that percentage in a manner similar to that described elsewhere herein for other image quality evaluation criteria. For example, the edge sharpness score can be equal to the percentage of visual images in the candidate clip having edge sharpness above a specified threshold.

Another criterion that can be used to evaluate the quality of a candidate clip is the amount of variation within the visual images of the clip (the "image contrast" criterion). A candidate clip that includes a large number of visual images having little or no variation within the image is penalized (e.g., given a low score), while a candidate clip that includes a large number of visual images having a lot of variation within the image is not (e.g., given a high score). As the variation within a visual image increases, the likelihood that the visual image is partially or fully blank decreases, i.e., as the variation within an image increases, the quality (desirability) of the visual image increases. (When there is no variation in a visual image, the visual image is partially or fully blank; as the variation in the visual image increases, at some point the visual image can be said with near complete confidence to not be partially or fully blank.) The variation in a visual image can be evaluated by, for example, evaluating the variance in pixel values within the entire visual image and/or within one or more subsections of the visual image, and determining whether the variance (or variances) is greater than a specified magnitude (or magnitudes). The variation in a visual image can also be evaluated by, for example, evaluating the number of pixels in the visual image that vary from a mean pixel value by more than a specified amount, again, for the entire visual image and/or for one or more subsections of the visual image, and determining whether that number of pixels is greater than a specified magnitude. In one implementation, in accordance with the invention, of evaluation of the quality of a candidate clip using the image contrast criterion, the variation in a visual image is evaluated by evaluating the variance in pixel values within the entire visual image and within a middle subsection of the visual image (e.g., the middle ninth of the visual image when the visual image is divided into nine equal rectangular sections) and determining whether the variances are greater than specified respective magnitudes, and evaluating the number of pixels in the visual image that vary from a mean pixel value by more than a specified amount, for both the entire visual image and for subsections of the visual image (e.g., for each ninth of the visual image when the visual image is divided into nine equal rectangular sections), and determining whether those numbers of pixels are greater than specified respective magnitudes. Depending on the amount of variation identified within a visual image, the visual image can be identified as a high-contrast image or a low contrast image. The percentage of visual images in the candidate clip that are high-contrast images (or, equivalently, the percentage of low-contrast images) can be calculated and a score for the candidate clip determined as a function of that percentage in a manner similar to that described elsewhere herein for other image quality evaluation criteria. For example, the image contrast score can be equal to the percentage of high-contrast visual images in the candidate clip.

Another criterion that can be used to evaluate the quality of a candidate clip is the presence of "garbage frames" within the clip (the "garbage content" criterion). A candidate clip that includes a relatively large number of garbage frames is penalized (e.g., given a low score), while a candidate clip that includes few or no garbage frames is not (e.g., given a high score). "Garbage frames" can include, for example, static frames and the highly uniform frames characteristic of NTSC loss-of-signal generators in VCR decks ("NTSC blue screen" frames). Evaluation of a frame (visual image) to determine whether the frame is a "garbage frame" can be accomplished using a method as described in commonly-owned, co-pending U.S. patent application Ser. No. 10/083,676, entitled "Detection and Labeling of Video Segments Corresponding to Digitized Sections of Tape without a Video Signal," filed on Feb. 25, 2002, by Michele Covell et al., the disclosure of which is hereby incorporated by reference herein. In one implementation, in accordance with the invention, of evaluation of the quality of a candidate clip using the garbage content criterion, a "generalized garbage density," GGD, is determined for the candidate clip. The GGD can be, for example, the total number of garbage frames in the clip divided by the total number of frames in the clip. A generalized garbage score, S_GARBAGE, is then mapped to the generalized garbage density, GGD, of the clip as follows, where MAX_GGD is a specified threshold generalized garbage density above which a clip is deemed to have minimum quality (according to this criterion):

```
IF GGD≧MAX_GGD
  S_GARBAGE=0.0
ELSE
  S_GARBAGE=1.0-GGD/MAX_GGD
```

Another criterion that can be used to evaluate the quality of a candidate clip is the presence of visual images having particularly high visual quality (sometimes referred to herein as "snapshots") within the clip (the "snapshot" criterion). A candidate clip that includes few or no snapshots is penalized (e.g., given a low score), while a candidate clip that includes a relatively large number of snapshots is not (e.g., given a high score). A "snapshot" is a visual image (frame) that is determined to have sufficiently high visual quality that the image is highly suitable for extraction from the visual recording and upsampling for the purposes of printing, e-mailing, etc. The evaluation of the visual quality of an image (including the criteria used) to determine whether the image is a "snapshot" can be performed using a method as described in the above-referenced U.S. patent application Ser. No. 10/198,602. (However, for use with some embodiments of this invention, the snapshot criterion can be implemented to be less stringent in view of the different goal, i.e., include all content in the visual recording summary except that of unacceptably low quality and/or very little or no interest. In one implementation, in accordance with the invention, of evaluation of the quality of a candidate clip using the snapshot criterion, a "snapshot density," SD, is determined for the candidate clip. The SD can be, for example, the total number of snapshots in the clip divided by the total number of frames in the clip. A snapshot density score, S_SNAP, is then mapped to the SD of the clip. This can be done, for example, using a clipped Gaussian function as follows. A target SD value, TARGET_SD, can be specified such that if a clip's SD is equal to or less than TARGET_SD, then the score, S_SNAP, for that clip is 1.0. For SDs greater than TARGET_SD, the score, S_SNAP, falls off in a Gaussian bell curve tail. The rate of fall-off can be controlled by a second parameter, SD_HALFLIFE, which is the difference between an actual SD and the TARGET_SD that yields a score, S_SNAP, of 0.5.

Another criterion that can be used to evaluate the quality of a candidate clip is the proximity of the clip to the beginning of a scene in the visual recording (the "front-loading" criterion). A candidate clip that is not near the beginning of a scene in the visual recording is penalized (e.g., given a low score), while a candidate clip that is near the beginning of a scene in the visual recording is not (e.g., given a high score). This criterion is based on the observation that typically a person tends to start recording with a camcorder (or other visual recording apparatus) when there is something interesting or valuable to be recorded (so that clips near the beginning of a scene of a visual recording tend to be of higher value or interest, i.e., quality) and stop recording with the camcorder when the scenery or subject becomes uninteresting or otherwise deemed of little value (so that clips near the end of a scene of a visual recording tend to be of lower value or interest, i.e., quality). In one implementation, in accordance with the invention, of evaluation of the quality of a candidate clip using the front-loading criterion, the duration of time, DELAY, from the beginning of the scene of which a candidate clip is part to the start of the clip is determined. A front-loading score, S_FRONT, is then mapped to the DELAY of the clip as follows, where FRONT_LOAD_CUTOFF is a specified threshold duration of time shorter than which a clip is deemed to have maximum quality (according to this criterion) and FRONT_LOAD_HALFLIFE is a duration of time after FRONT_LOAD_CUTOFF at which the clip is deemed to have "medium quality" (i.e., a front-loading score, S_FRONT, of 0.5) when the front-loading score, S_FRONT, decays exponentially as the DELAY of the clip increases beyond FRONT_LOAD_CUTOFF:

IF DELAY≦FRONT_LOAD CUTOFF:
S_FRONT=1.0
ELSE
S_FRONT=exp(−0.693147*(DELAY−FRONT_CUTOFF /FRONT_LOAD_HALFLIFE)

Another criterion that can be used to evaluate the quality of a candidate clip is the characteristic(s) of the audio content that accompanies the visual images of a clip (the "audio content" criterion). A candidate clip that includes no audio content or audio content having characteristic(s) that suggest the audio content is not informative or not interesting, as explained further below, is penalized (e.g., given a low score), while a candidate clip that includes audio content having characteristic(s) that suggest the audio content is informative or interesting is not (e.g., given a high score). This criterion is based on the observation that the presence of certain characteristic(s) in audio content, such as speech or high energy, makes the corresponding visual images more likely to be interesting or valuable.

In one implementation, in accordance with the invention, of evaluation of the quality of a candidate clip using the audio content criterion, the audio content that accompanies the visual images of a candidate clip is evaluated to identify the presence of speech in the audio content. The audio content score given to a clip increases as the percentage of the audio content identified as speech increases. For example, the audio content score for this implementation can be equal to the number of seconds of speech audio detected in the clip divided by the duration of the clip. The evaluation of audio content to identify the presence of speech can be performed using any of a variety of techniques well known to those skilled in the art of speech recognition. For example, most speech SDK (software development kit) products, such as the Scansoft speech SDK, contain speech/non-speech detectors.

In another implementation, in accordance with the invention, of evaluation of the quality of a candidate clip using the audio content criterion, the audio content that accompanies the visual images of a candidate clip is evaluated to identify the amount of audio energy in the audio content. The audio content score given to a clip increases as the amount of audio energy in the audio content increases. In a particular implementation, the short-time log-energy of the audio content is determined. The short-time log-energy of the audio content can be determined using techniques known to those skilled in the art. To evaluate stereo audio content, the stereo audio content can be transformed into mono audio content by averaging together the left and right channels of the stereo audio content, or one or both of the left and right channels can be evaluated independently. A short-time log-energy value is determined for the audio content corresponding to each frame. The short-time log-energy values for each frame in the clip are averaged to produce an "average log energy," ALE, for the clip. An audio content score, S_AUDIO, is then mapped to the ALE of the clip as follows, where AUDIO_TARGET is a specified threshold average log energy above which a clip is deemed to have maximum quality (according to this criterion) and AUDIO_MIN is a specified minimum audio content score (typically non-zero) that is assigned to a clip accompanied by total silence (a non-zero minimum audio content score is used in recognition of the fact that silent clips can also be interesting):

IF ALE>AUDIO_TARGET
S_AUDIO=1.0
ELSE
S_AUDIO=AUDIO_MIN+ALE*(1−AUDIO_MIN)/AUDIO_TARGET

Another criterion (or criteria) that can be used to evaluate the quality of a candidate clip are operational parameter(s) of the visual recording apparatus used to obtain the visual recording (the "camera hints" criterion). A candidate clip in which a specified state of, or change in, one or more visual recording apparatus operational parameters occurs can be rewarded (e.g., given a high score), while a candidate clip in which this does not occur is not (e.g., given a low score). This criterion is based on the observation that the value(s) of such parameter(s) can indicate when the person operating the visual recording apparatus found the content of the visual recording to be of particular interest or value.

For example, some visual recording apparatus (e.g., many camcorders) include a "snapshot" button which can freeze the visual image being acquired for a specified duration of time, e.g., 1-10 seconds. Activation of a snapshot button typically indicates that the person operating the visual recording apparatus found the visual recording content being acquired at that time to be of particular interest or value. Thus, in one implementation, in accordance with the invention, of evaluation of the quality of a candidate clip using the camera hints criterion, a determination is made as to whether a snapshot button was activated during a candidate clip. Candidate clips during which a snapshot button was activated can be given a high score, while other clips are given a low score. Determination as to whether a snapshot button was activated can be done by evaluating the visual images of a candidate clip to determine whether the content of successive images remains unchanged for a specified duration of time: if so, it can be concluded that the snapshot button was activated. The specified duration of time is established as a range of times: shorter than that fails to give a likely indication that a snapshot button was activated; longer indicates some other phenomenon occurring (e.g., a visual recording apparatus laid down and left on unintentionally) that fails to indicate visual recording content of interest (and, in fact, may indicate visual recording content of no interest). The specified duration of time can be established, for example, as a range of times including the shortest and longest durations of time known to be used by existing camcorders to freeze the visual image in response to activation of a snapshot button. Evaluating the visual images of a candidate clip to determine whether the content of successive images remains unchanged for a specified duration of time can be done, for example, by using techniques described in the above-referenced U.S. patent application Ser. No. 10/198,602.

Other visual recording apparatus operational parameters that can be used to glean hints regarding the quality of a clip include zoom and motion of the visual recording apparatus (i.e., pan, tilt, rotation). Movement (panning, in particular) and/or zooming of a visual recording apparatus may indicate that the visual images acquired for a period of time after (and, perhaps, just before) the end of the movement include content of interest or value. A sharp change in one or more of these parameters often indicates content that is of particular interest or value. In another implementation, in accordance with the invention, of evaluation of the quality of a candidate clip using the camera hints criterion, a determination is made as to whether a candidate clip includes a zooming operation after a panning motion of the visual recording apparatus. Candidate clips in which such operation of the visual recording apparatus occurs, or candidate clips that occur immediately after (or within a specified duration of time after) such operation of the visual recording apparatus occurs, can be given a high score, while other clips are given a low score. Further, for clips after such operation, the score can depend on the proximity of the clip to the end of such operation: the nearer the clip, the higher the score. Identification of zooming and motion of a visual recording apparatus can be accomplished, for example, using techniques well known to those skilled in the field of computer vision.

When multiple criteria are used in evaluating the quality of candidate clips, a sub-score can be determined based on each criterion for each clip and the sub-scores for each clip combined to produce an overall score for the clip. Sub-scores can be combined in any desired manner. For example, the score for a candidate clip can be a weighted combination of sub-scores for the clip, e.g., a weighted average of sub-scores, a weighted non-linear combination of sub-scores. When the score for a candidate clip is a weighted combination of sub-scores for the clip, the weight associated with each criterion can be determined in accordance with a format template. This may happen indirectly: as described elsewhere herein, the identification in a format template of a type of visual recording can cause, among other things, a specified set of criteria weights to be used in selecting candidate clips for inclusion in the visual recording summary (see, e.g., FIG. 2 and the associated description below). In one implementation of embodiments of the invention in which multiple criteria are used in evaluating the quality of candidate clips, the sub-scores for a candidate clip are combined as follows:

$$S\_FINAL(J)=SUM(W(K)*\log(S\_SUB(J,K))) \text{ for all sub-scores } K$$

where:
S_FINAL(J)=overall score for the Jth candidate clip,
W(K)=weight of the Kth sub-score, $W(K) \geq 0$
S_SUB(J, K)=Kth sub-score for the Jth candidate clip, $0 \leq S\_SUB(J, K) \leq 1$ The invention can be implemented so that the result of some criterion evaluations mandate a particular disposition of a clip, i.e., inclusion or exclusion from the visual recording summary. This may be achieved, for example, by assigning a score of 1.0 or 0.0 to the clip, where 1.0 mandates inclusion in the visual recording summary and 0.0 mandates exclusion from the visual recording summary. For example, the invention can be implemented so that a clip for which AutoHint feedback has been given, as discussed elsewhere herein, must either be included (good AutoHint feedback) or excluded (bad AutoHint feedback) from the visual recording summary. Or, for example, the invention can also be implemented so that a clip having a "perfect" or near perfect score based on the garbage content criterion (i.e., a score of 0 or very near 0) is excluded from the visual recording summary regardless of what other sub-scores may be.

In step 103 of the method 100 for creating a summary of a visual recording described above, candidate clips are selected for inclusion in the visual recording summary based on the evaluations of the candidate clips. For example, after the quality of the candidate clips has been evaluated and each candidate clip assigned a quality score, the candidate clips can be sorted based on their quality scores, e.g., the candidate clips can be ranked in increasing or decreasing order of score. Clips with the highest quality scores can be selected for inclusion in the final visual recording summary. Clips are selected for inclusion in the visual recording summary beginning with the clip(s) having the highest quality score and continuing to include clips having successively lower quality scores until the visual recording summary has been fully populated with clips in accordance with an established criterion or criteria. Often, a duration is specified for the visual recording summary, expressed either as an absolute duration of time or as a percentage of the duration of time of the original visual recording. In that case, then clips having successively lower quality scores are included until the addition of a next clip would cause the total time of all of the selected candidate clips to exceed the specified duration of time of the visual recording summary. If a duration of the visual recording summary is not specified, then another criterion or criteria must be specified that may (and, in most cases, will) limit inclusion of clips in the visual recording summary (in theory, if all clips of a visual recording are evaluated to be of sufficiently high quality, the visual recording summary can include all of the original visual recording; however, it is anticipated that, in practice, this will not occur or, at least, is highly unlikely). For example, the invention can be implemented so that all clips having a quality score greater than a specified magnitude are included in the visual recording summary. In that case, then clips having successively lower quality scores are included until the next clip to be included has a quality score lower than or equal to the specified magnitude.

Above, various criteria have been described that can be used in evaluating the quality of a candidate clip. Additionally, various parameters have been discussed with respect to particular implementations of evaluation of the quality of a candidate clip using those criteria. Further, combination of criteria to produce an evaluation of the quality of a candidate clip, including the weight to be given to each criterion, has been discussed. Similarly, various other parameters have been discussed herein that are used in evaluating visual images (e.g., determination of similarity between two visual images, discussed in more detail below) or making other determinations for use in implementing the invention. The particular criter(ia) used in evaluating the quality of a candidate clip, the parameter value(s) used in effecting an evaluation based on a particular criterion, the weight to be given to an evaluation based on a particular criterion, and other parameter value(s) used in evaluating visual images or making other determinations for use in producing a visual recording summary in accordance with the invention can be established by analyzing a training suite of representative visual recording content (e.g., real visual recordings, such as real consumer home video recordings) to identify which criter(ia), weight(s) and parameter value(s) produce the best results (i.e., visual recording summaries having desired characteristics, such as minimum visual image quality and/or duration).

Particular types of visual recordings (e.g., wedding videos that are often professionally recorded, vacation videos that are often recorded poorly, 8 mm video recordings that may be of poor quality, old video recordings of poor quality) can have associated typical characteristics that differ from the typical characteristics of other types of visual recordings. As a consequence, the particular criter(ia), weight(s) and parameter value(s) that produce the best visual recording summaries can depend on the type of visual recording for which a summary is being produced. Thus, different training suites of visual recording content of different types can be analyzed to identify the particular combinations of criter(ia), weight(s) and parameter value(s) that produce the best results for visual recordings of various types. The invention can be implemented to enable selection of particular combinations of criter(ia), weight(s) and parameter value(s). In particular, the invention can be implemented to enable specification of a visual recording type that, in turn, causes an associated particular combination of criter(ia), weight(s) and parameter value(s) to be used in creating a visual recording summary. A format template can be used for this purpose, i.e., to specify a visual recording type that causes an associated particular combination of criter(ia), weight(s) and parameter value(s) to be used in creating a visual recording summary (see FIG. 2 and associated description below).

As indicated elsewhere herein, the invention can advantageously be used to automatically edit a visual recording in a manner that creates a summary of the visual recording in which only content that is of unacceptably low quality and/or very little or no interest is eliminated, thereby enabling the original unsummarized visual recording to be discarded if desired (with attendant benefits). Typically, this will result in a visual recording summary that includes most of the content of the original unsummarized visual recording, i.e., the duration of the visual recording summary is typically greater than 50% (e.g., 75% or more) of the duration of the original unsummarized visual recording. However, the goal is generally to retain all visual recording content that may be deemed to be of any value, since the consequences of discarding the original unsummarized visual recording may be severe (i.e., if desirable content is among that discarded, it cannot be retrieved). Consequently, embodiments of the invention intended for use in automatically editing visual recordings to produce a visual summary of this type must be carefully implemented to minimize the possibility that desirable content is among that discarded (particularly since some or all of creation of the visual recording summary occurs automatically, i.e., without human intervention). For such embodiments of the invention, therefore, it is particularly important to identify which criter(ia), weight(s) and parameter value(s) produce visual recording summaries that retain all visual recording content that may be deemed to be of any value. As discussed above, the particular criter(ia), weight(s) and parameter value(s) that should be used can be determined by analyzing a training suite of representative visual recording content. Further, in implementing such embodiments of the invention, it can be particularly desirable to analyze different training suites of visual recording content of different types to identify particular combinations of criter(ia), weight(s) and parameter value(s) that produce the best results for visual recordings of various types.

A training suite of representative visual recording content can be analyzed to determine particular criter(ia), weight(s) and parameter value(s) that should be used for an embodiment of the invention as follows. The training suite can be viewed and visual images of the visual recording given a score, e.g., a score from 1-10. To increase the reliability of the scores, visual images can be viewed in pairs. Visual images having particularly high scores or particularly low scores are marked as particularly good or particularly bad, respectively. Visual images that fall somewhere in between are not marked. The unmarked visual images are discarded from the training set. For any proposed set of criter(ia), weight(s) and parameter value(s) an error measure can be defined: Error=sum (num bad scenes in summary)−sum(num good scenes in summary). The set of criter(ia), weight(s) and parameter value(s) can then be fit to the remaining visual images in the training set using an appropriate statistical technique (e.g., maximum likelihood estimation, least squares estimation), a variety of which are known to those skilled in the art. Whichever set of criter(ia), weight(s) and parameter value(s) produces the best fit can be chosen for use in that embodiment of the invention.

In some embodiments of the invention, it can be desirable to impose other constraints on the selection of clips. For example, the invention can be implemented so that preference is given to clips so as to increase the likelihood of selecting clips throughout the visual recording for inclusion in the visual recording summary. This can be done by specifying a clip separation criterion or criteria. For example, a clip separation criterion can require that each clip be separated from other clips by a specified duration of time. Or, a clip separation criterion can limit the "density" of clips, e.g., selected clips cannot be more than a specified percentage of the visual recording over a specified period of time. It can also be desirable to implement the invention so that clips determined to be redundant are excluded from the visual recording summary. Redundant clips can be identified using a method to identify similarity between the clips, as discussed further below.

As indicated above, typically, the visual recording summary will be displayed and usually the clips of the visual recording summary are displayed in chronological order. In such case, after the clips are selected for inclusion in the visual recording summary, the selected clips are arranged into chronological order. This can be done using temporal information associated with each clip that identifies when the clip was recorded (either as an absolute time or relative to one or more other clips of the recording). However, in general, the selected clips can be displayed in any order. A format template can be used to specify the particular order in which selected clips are to be displayed. For example, a format template can specify that clips be displayed in chronological order in the visual recording summary.

The invention can be implemented so that selected clips are marked (e.g., clip indices, such as the starting and ending frames of selected clips, identified), enabling later extraction from the visual recording, or extracted from the visual recording when selected. When one or more pairs of selected clips overlap, as it is anticipated will typically be the case, data representing the overlapping parts of selected clips can be extracted only once by comparing the indices defining each clip to be extracted to indices (updated as each selected clip is extracted) specifying the parts of the visual recording for which data has already been extracted. (Overlapping clips can be managed in a similar manner when selecting clips for a visual recording summary of a specified duration: as clips are selected, their indices are compared to indices—updated for each selected clip—specifying the parts of the visual recording for which a clip has already been selected. The cumulative duration represented by these indices is compared to the specified duration of the visual recording summary and clips continually selected until the two match.) As discussed in more detail elsewhere herein, an advantage of extracting the selected clips from the visual recording when selected is that the resultant visual recording summary can be stored and the original visual recording discarded. If the selected clips have been marked but not extracted from the visual recording, the clip indices of the selected clips can be stored in a playlist file, either in the order in which the clips are to be displayed or together with information that indicates that order. An advantage of this approach is that a large number of visual recording summaries can be created from a single visual recording with very little data storage cost, since only relatively small sets of indices are stored, rather than relatively large sets of visual images. The invention can be implemented so that an MPEG transcoder is used to generate the actual visual recording summary data.

The invention can be implemented so that special effects and/or transitions are added to the display of the visual recording summary. Special effects and/or transitions that be added to a visual recording summary in accordance with the invention include, for example, transitions such as cross fades, dissolves, wipes or shutters between selected clips, or video effects such as black and white transformations or color enhancements. The special effects and/or transitions can be produced using techniques known to those skilled in the art. For example, conventional transition generators can be used to produce transitions of a desired type. The invention can be implemented to make use of the same type of transition throughout a visual recording summary or the invention can be implemented to make use of multiple types of transitions in a visual recording summary. The particular special effects and/or transitions added to a visual recording summary can be chosen in accordance with style specification(s) in a format template associated with the visual recording summary and can depend on, for example, beats in music that is selected to accompany the visual recording summary. For example, a cross fade is a common transition used by professional editors that can be used in implementing the invention. A cross fade can be suitable for use in, for example, a visual recording summary that is to be accompanied by a relatively slow piece of music. The invention can be implemented, for example, to use cross fades randomly throughout a visual recording summary or to use a cross fade for a transition that occurs when the beat intervals that occur near the transition are above a specified level (or, conversely, when the beat frequency at the location of the transition is below a specified level). Similarly, a dissolve can be used for transitions that occur in the vicinity of slow beats (i.e., long beat intervals).

The invention can be implemented so that the audio content of the original visual recording, if any, is presented in a desired manner. For example, the audio from the original visual recording can be replaced with one or more music selections. The invention can be implemented so that the music selection(s) can be specified by a user (e.g., the owner or creator of the original visual recording) or so that the music selection(s) are automatically selected from a set of possible music selections by a method, system, apparatus or computer program that implements the invention. In the latter case, the invention can be implemented so that the music selection(s) are selected in accordance with style specification(s) in a format template associated with the visual recording summary. Automatic selection of music to accompany a visual recording summary can be performed, for example, using techniques described in the above-referenced U.S. patent application Ser. No. 10/448,255. Rather than replacing the audio from the original visual recording with music selection(s), both the original audio and the music selection(s) can played together. In that case, audio energy calculations and/or speech/non-speech detection results for each clip (which may already have been determined as part of use of the audio content criterion in evaluating the quality of a candidate clip) can be used to emphasize or de-emphasize the original audio with respect to the music selection(s).

To enhance the display of the visual recording summary, the invention can be implemented to produce particular effects at the end of the display. For example, audio content that is included as part of the visual recording summary can be faded to silence as the end of the display approaches. Similarly, the visual images of the visual recording summary can be faded out or faded to a specified color (e.g., black) as the end of the display approaches. Additionally, the invention can be implemented so that both the audio content and the visual images are faded out (or the visual images faded to a specified color) as the end of a display of a visual recording summary approaches.

The invention can also be used to produce multiple visual recording summaries from a single visual recording. Each of the multiple visual recording summaries can be produced using a method described herein for creating a summary of a visual recording, each method differing in the details of implementation, such as the criter(ia) used to evaluate visual images, the value(s) of parameter(s) used in evaluation (s) in accordance with particular criter(ia), the duration of the visual recording summary and/or the clips to be included in the summary, etc.

The invention can also be used to produce two visual recording summaries to be combined together: a first, very short summary intended to include only highlights of the visual recording (a "highlights" summary) and a second, much longer summary intended to include all content of the visual recording except that deemed of unacceptably low quality and/or very little or no interest (a "cleanup" summary). Such an embodiment of the invention can be further implemented so that a viewer, while viewing the first (short) visual recording summary, can "select" a part of the first summary, which then causes display of the second (long) visual recording summary beginning with the selected part of the first summary, i.e., the viewer can use the first visual recording summary to quickly navigate through the second visual recording summary to a point of interest in the second summary. In one implementation of an embodiment of the invention including a highlights summary and a cleanup summary, the first visual recording summary is created using a method as described in the above-referenced U.S. patent application Ser. No. 10/448,255, and the second visual recording summary is created using a method described herein for creating a summary of a visual recording.

As indicated above, a summary of a visual recording can be produced in accordance with the invention by creating the visual recording summary in accordance with a format template that imposes a certain overall style to the visual recording summary. FIG. 2 illustrates a format template that can be used in creating a visual recording summary according to the invention. Lines 2 through 27 of the format template specify instructions that are used in creating a summary of a visual recording and/or displaying a summary of a visual recording. In line 2 of the format template, a visual recording type is specified that identifies the type of visual recording for which the format template is intended to be used and, as described above, causes an associated particular combination of criter(ia), weight(s) and parameter value(s) to be used in creating a visual recording summary in accordance with the invention. In line 3 of the format template, a music selection is specified to accompany the visual recording summary. In lines 4 and 5 of the format template, several rules governing creation of the visual recording summary are specified. The first rule indicates that the duration of the summary is to be the duration of the music selection specified to accompany the visual recording summary (see line 3 of the format template). The next rule indicates that clips having a quality score, determined as discussed elsewhere herein, of less than 0.2 (on a scale of 0-1) cannot be included in the visual recording summary. Then last two rules specify values of parameters used in evaluating clips of the visual recording summary based on particular criteria. The invention can be implemented so that explicit parameter specifications such as these in a format template override any conflicting parameter specifications, such as parameter specifications arising from a specification of a visual recording type as in line 2 of the format template. In line 6 of the format template, a transition type (in this case, a fade up from black) is specified for use at the beginning of display of the visual recording-summary. In line 7 of the format template, a visual image not part of the visual recording (in this case, a title of the visual recording summary) is identified for use at the beginning of display of the visual recording summary; the duration of the display of that visual image is also specified (in this case, 5 seconds). In line 8 of the format template, a transition type is specified for use between the display of the title and the display of a next visual image. Lines 9 through 24 of the format template specify instructions that are used in displaying the clips of the visual recording summary that were selected from the visual recording. The instructions of lines 9 through 24 are repeated until all clips of the visual recording summary have been displayed. Lines 10, 12, 14, 16, 18 and 20 of the format template each specify a duration of time for displaying selected clips. As discussed elsewhere herein, the selected clips are displayed in a specified order (often, chronological order); the order of display of selected clips is specified explicitly in the format template illustrated in FIG. 2. Line 20 of the format template also indicates that clips that have previously been displayed once before and that have a quality score of at least 0.5 (on a scale of 0-1) can be displayed during the indicated duration of display time. Line 22 of the format template identifies a clip that is not from the visual recording that is to be displayed during the display of the visual recording summary. Lines 11, 13, 15, 17, 19, 21 and 23 of the format template specify transition types for use between the displays of clips governed by the instructions of lines 10, 12, 14, 16, 18, 20 and 22. In line 25 of the format template, a transition type is specified for use between the display of the last clip displayed by the instructions of lines 9 through 24 and the display of an ending visual image that is not part of the visual recording and that is identified in line 26 of the format template. In line 27 of the format template, a transition type (a fade to black) is specified for use at the end of visual recording summary display.

Figure 3:
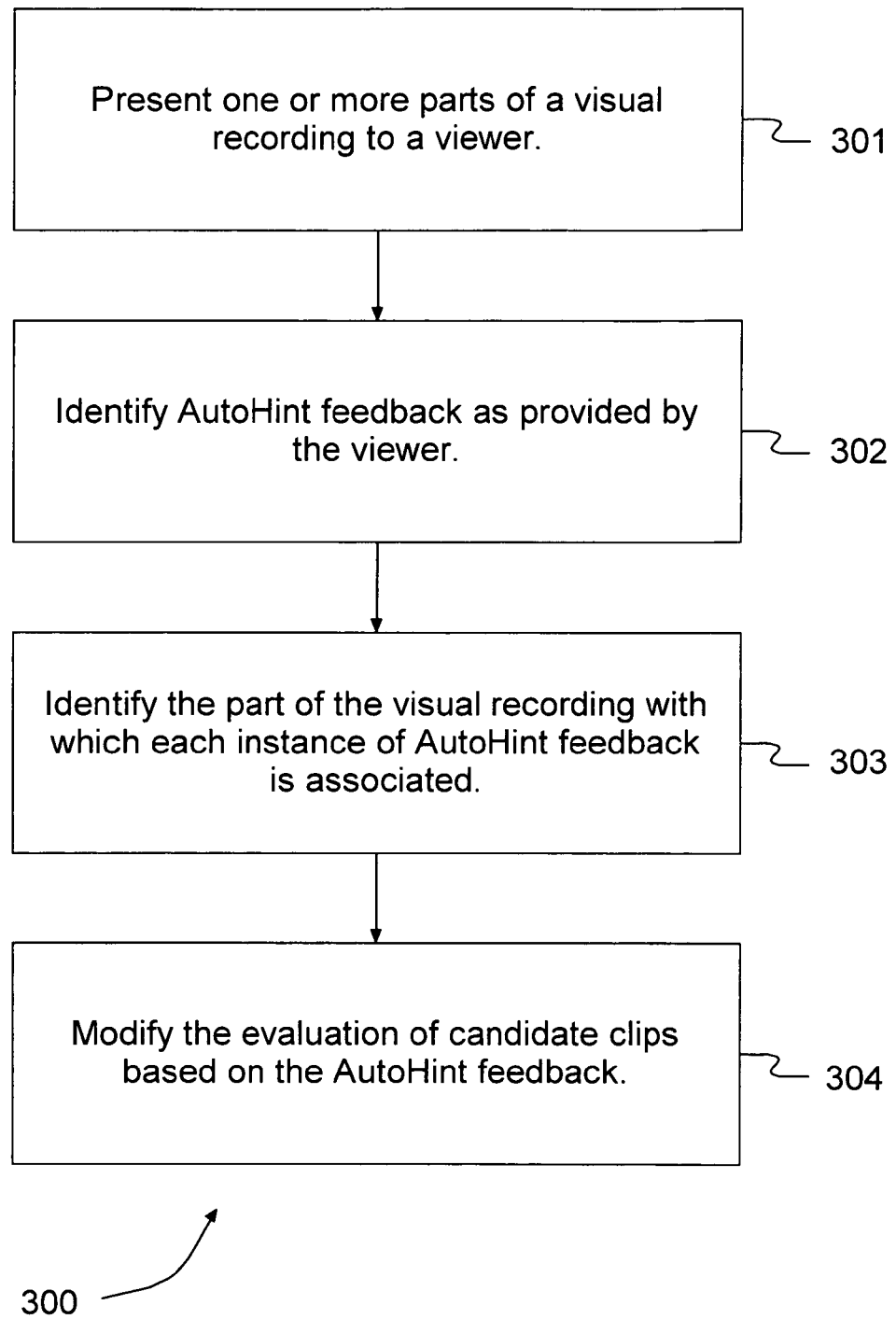
FIG. 3 is a flow chart of a method, according to an embodiment of the invention, for using AutoHint feedback in the evaluation of candidate clips of a visual recording to produce a summary of the visual recording.

As discussed above, the invention can be implemented so that the evaluation of candidate clips can be modified based on AutoHint feedback, which is an indication from a viewer of the visual recording that a part of the visual recording is good (i.e., desirable to include in a summary of the visual recording) or bad (i.e., not desirable to include in a summary of the visual recording). FIG. 3 is a flow chart of a method 300, according to an embodiment of the invention, for using AutoHint feedback in the evaluation of candidate clips of a visual recording (e.g., in the implementation of step 102 of the method 100, described above with respect to FIG. 1) to produce a summary of the visual recording. In step 301, one or more parts of a visual recording are presented to a viewer. As discussed in more detail below, the part(s) of the visual recording can be one or more visual images, one or more clips, a combination of visual images and clips, or the entire visual recording. In step 302, AutoHint feedback is identified as provided by the viewer. In general, this can be done using conventional user input apparatus and associated methods. Particular ways in which the invention can be implemented to enable a viewer to provide AutoHint feedback are described in more detail below. In step 303, the part of the visual recording with which each instance of AutoHint feedback is associated is identified. As indicated above, an AutoHint part of a visual recording (i.e., the part with which an AutoHint is associated) can be a single visual image (sometimes referred to herein as an "AutoHint image") or a clip (sometimes referred to herein as an "AutoHint clip"). Ways of associating AutoHint feedback with a part of the visual recording are described in more detail below. In step 304, the evaluation of candidate clips is modified based on the AutoHint feedback. Ways in which this can be done are discussed in more detail below.

The invention can enable provision by a viewer of AutoHint feedback that is associated with a single visual image in several ways. First, a set of visual images (at least some—and, typically, all—of which are temporally separated, i.e., the set of visual images are not all contiguous such that they comprise a clip) can be presented to a viewer for possible provision of AutoHint feedback for one or more of the visual images. Though it is possible for a single visual image to be presented to a viewer for possible provision of AutoHint feedback, it is anticipated that the set of visual images will typically include multiple visual images. When multiple visual images are presented, the visual images can be presented one at a time in a series, in a series of groups of visual images (at least one group including multiple visual images and, typically, many or all of the groups including multiple visual images), or all together as a single group. Single visual images to be presented to a viewer for provision of possible AutoHint feedback can be chosen in one or more of several ways. For example, a single visual image to be presented to a viewer for provision of possible AutoHint feedback can be a keyframe. A keyframe is a visual image in a scene that is representative of that scene. A keyframe can be identified, for example, using any of the methods described in the above-referenced U.S. patent application Ser. Nos. 09/792,280, 10/198,602, and 10/448,255. A single visual image to be presented to a viewer for provision of possible AutoHint feedback can be a "snapshot." A snapshot is, as discussed above, a visual image that is determined to have sufficiently high visual quality that the image is highly suitable for extraction from the visual recording and upsampling for the purposes of printing, e-mailing, etc. A snapshot can be identified using a method as described in the above-referenced U.S. patent application Ser. No. 10/198,602. A set of single visual images to be presented to a viewer for provision of possible AutoHint feedback can also be chosen "mechanically" by, for example, presenting every nth visual image of a visual recording or segment of the visual recording to the viewer.

The invention can also enable provision by a viewer of AutoHint feedback that is associated with a single visual image by presenting one or more clips to a viewer for possible provision of AutoHint feedback for one or more of the clips. Clips to be presented to a viewer for provision of possible AutoHint feedback can be chosen in one or more of several ways. For example, a clip to be presented to a viewer for provision of possible AutoHint feedback can be a scene or a specified part of a scene (e.g., the first n seconds of a scene). (Scenes in a visual recording can be determined as discussed above.) The invention can be implemented, for example, so that the first n seconds of each scene in a visual recording is presented to a viewer for provision of possible AutoHint feedback. Clips can also be constructed for presentation to a viewer for provision of possible AutoHint feedback by identifying a visual image (e.g., keyframe, snapshot) and specifying a section of the visual recording having a particular duration and relationship to that visual image (e.g., a section of the visual recording of n seconds duration that begins with the visual image or that is centered on the visual image). Clips can also be presented to a viewer for provision of possible AutoHint feedback by successively presenting clips of uniform duration of n seconds that begin at intervals of m seconds throughout the visual recording (starting with a clip that begins at the beginning of the visual recording). Candidate clips can also be presented to a viewer for provision of possible AutoHint feedback. When a viewer provides AutoHint feedback while viewing one of the clips, a "representative" visual image is chosen to be the AutoHint image. The AutoHint image can be the visual image being displayed at the instant that the AutoHint feedback was provided by the viewer. Recognizing that there will typically be a time lag between the display of content that prompted the viewer to provide the AutoHint feedback and the instant that the AutoHint feedback was provided, the AutoHint image can be the visual image that is a specified amount of time prior to the visual image being displayed at the instant that the AutoHint feedback was provided by the viewer. Or, the AutoHint image can be the first image of the clip; in particular, this can be appropriate when the clip is a scene or the first n seconds of a scene. Or, the AutoHint image can be the image in the clip or in the section of the clip displayed up to the time at which the AutoHint feedback was provided (or a specified amount of time prior to that time) that is determined to be most similar to an "average" image of the clip having properties that are the average of all images in the clip. As those skilled in the art can appreciate, there are many other possibilities for selecting the AutoHint image.

Finally, the invention can also enable provision by a viewer of AutoHint feedback that is associated with a single visual image by presenting the entire visual recording to the viewer and monitoring the provision of AutoHint feedback throughout the display of the visual recording. When the viewer provides AutoHint feedback, a "representative" visual image is chosen to be the AutoHint image. The AutoHint image can be the visual image being displayed at the instant that the AutoHint feedback was provided by the viewer. Or, the AutoHint image can be the visual image that is a specified amount of time prior to the visual image being displayed at the instant that the AutoHint feedback was provided by the viewer.

The invention can enable provision by a viewer of AutoHint feedback that is associated with a clip in several ways. First, one or more clips can be presented to a viewer for possible provision of AutoHint feedback. Clips to be presented to a viewer for provision of possible AutoHint feedback can be chosen as described above. When AutoHint feedback is provided, the AutoHint feedback can be associated with the clip that was being displayed at the instant that the AutoHint feedback was provided by the viewer.

The invention can also enable provision by a viewer of AutoHint feedback that is associated with a clip by presenting the entire visual recording to the viewer (or a section of the visual recording) and monitoring the provision of AutoHint feedback throughout the display of the visual recording. When a viewer provides AutoHint feedback, a "representative" clip is established to be the AutoHint clip. The AutoHint clip can be established by choosing a "representative" visual image, then defining the AutoHint clip with respect to that visual image. The representative visual image can be, for example, the visual image being displayed at the instant that the AutoHint feedback was provided by the viewer, or the visual image that is a specified amount of time prior to the visual image being displayed at the instant that the AutoHint feedback was provided by the viewer. The AutoHint clip can, for example, be defined to have a specified duration, and be centered on the representative visual image, begin with the representative visual image, or end with the representative visual image. Or, the AutoHint clip can be established to include all visual images before and after the representative visual image that are determined to be sufficiently similar to the representative visual image, in accordance with a specified criterion or criteria.

As indicated above, the degree of similarity between the AutoHint part of the visual recording and other parts of the visual recording is determined and used to decide whether, or to what degree, the AutoHint feedback modifies the evaluation of those other parts of the visual recording. The invention can be implemented so that, beginning with the parts (e.g., frames or clips) of the visual recording adjacent to the AutoHint part (e.g., frame or clip) of the visual recording and continuing with successive parts (e.g., successive frames or clips) in both directions away from the AutoHint part, parts of the visual recording are successively compared to the AutoHint part of the visual recording to determine the degree of similarity of the AutoHint part to each of those other parts. Parts of the visual recording continue to be compared to the AutoHint part so long as the last part compared was determined to be sufficiently similar (in accordance with a predetermined criterion or criteria, as described further below) to the AutoHint part. The degree of similarity between the AutoHint part (e.g., frame or clip) of the visual recording and another part (e.g., frame or clip) of the visual recording can affect the AutoHint score and/or the weight assigned to the AutoHint score in determining the overall score for a candidate clip: in general, as the degree of similarity increases, the AutoHint score and/or the weight assigned to the AutoHint score also increases, and vice versa. The degree of similarity between the AutoHint part of the visual recording and another part of the visual recording can be determined in any appropriate manner. For example, as known to those skilled in the art of visual image analysis, the degree of similarity between two visual images (frames) can be determined by evaluating the change in grayscale texture pattern between the visual images, evaluating the change in color histograms (which can be normalized) between the visual images, and/or evaluating motion vectors. In one embodiment of the invention, the degree of similarity between visual images is determined by evaluating the changes in magnitudes of the grayscale pixel values between the visual images (e.g., by evaluating the percentage of pixels for which the grayscale change between visual images is above a specified threshold). In a particular embodiment, corresponding grayscale pixel values are determined to be different if their magnitudes differ by more than 5% (or more than about 5%, and two visual images are determined to be similar if less than 5% (or less than about 5%) of the grayscale pixel values are different. In a further embodiment of the invention, the degree of similarity between visual images is evaluated as in the previous embodiment and by further evaluating the change in normalized color histogram counts between the visual images for a specified histogram bin size. For example, 8 bins can be used for each dimension of a two-dimensional color histogram, i.e., 64 bins total. A standard histogram difference measure, known to those skilled in the art, can be determined. The results from all measures can be combined as a weighted linear sum, i.e., $M=(w1*Histogram\_Difference)+(w2*Pixel\_Difference)$. If M is greater than a specified threshold value, then the images are said to be different. The degree of similarity between two visual images can also be evaluated using a method as described in the commonly owned, co-pending U.S. Provisional Patent Application entitled "The Process-response Histogram: a Method and General Framework for Computing Image Similarity," filed on Nov. 26, 2003, by Brett Keating et al., the disclosure of which is hereby incorporated by reference herein. When the degree of similarity is being determined between a visual image and a clip, or between two clips, the comparison can be made by determining average pixel values or differences for all of the images of a clip, or by determining the similarity between all possible combinations of images and averaging the results of those similarity determinations. Another way in which similarity can be determined between two clips (or a clip and a visual image) is by picking one or more prototype images in the clip and comparing the image(s) against one or more prototype images in another clip (or another visual image), where a prototype image can be an image that is determined to be closest to the average clip image. For purposes of modifying the evaluation of a visual image of the visual recording, an AutoHint clip can be compared to visual images within or outside of the AutoHint clip to determine the similarity between the AutoHint clip and the visual image.

As indicated above, the AutoHint feedback can be used to modify quality scores determined for candidate clips of a visual recording. For example, in one embodiment of the invention including the capability for providing an AutoHint, AutoHint feedback that a part of a visual recording is good mandates that a candidate clip including that part of the visual recording, or included in that part of the visual recording (in the case of an AutoHint clip that is larger than the candidate clip), must be included in the visual recording summary. In a further embodiment, candidate clips that are determined to be sufficiently similar to such a candidate clip, in accordance with a specified criterion or criteria, are also included in the visual recording summary. Similarly, in another embodiment of the invention including the capability for providing an AutoHint, AutoHint feedback that a part of a visual recording is bad can mandate that a candidate clip including that part of the visual recording not be included in the visual recording summary, and, in a further embodiment, candidate clips that are determined to be sufficiently similar to such a candidate clip, in accordance with a specified criterion or criteria, are prevented from being included in the visual recording summary. The foregoing embodiments can also be combined as desired. For example, the invention can be embodied so that AutoHint feedback that a part of a visual recording is good mandates that a candidate clip including that part of the visual recording, or included in that part of the visual recording, as well as any candidate clip determined to sufficiently similar, must be included in the visual recording summary, while AutoHint feedback that a part of a visual recording is bad mandates that a candidate clip including that part of the visual recording, or included in that part of the visual recording, not be included in the visual recording summary.

Embodiments of the invention including the capability for providing AutoHint feedback can also be implemented so that the AutoHint feedback is used as a new criterion with which to produce a sub-score (the "AutoHint score") for a candidate clip, which is then combined with the other sub-score(s) for the candidate clip to produce an overall score for the candidate clip. The AutoHint score for a candidate clip can be assigned a weight in the combination of sub-scores as deemed appropriate, as for clip sub-scores produced using other criteria. In determining an AutoHint score for a candidate clip, the similarity of an AutoHint part to other parts of a visual recording can be determined and used to produce an AutoHint score for those other parts of the visual recording. For example, if the invention is implemented to enable a viewer to identify AutoHint image(s), the following is one way in which visual images of the visual recording can be assigned AutoHint scores. Each AutoHint image that is identified as good, as well visual images that are determined to be of sufficient similarity to such an AutoHint image can be assigned a maximum AutoHint score (e.g., 1.0 on a scale of 0-1). Each AutoHint image that is identified as bad, as well visual images that are determined to be of sufficient similarity to such an AutoHint image can be assigned a minimum AutoHint score (e.g., 0.0 on a scale of 0-1). All other visual images can be assigned an intermediate AutoHint score (e.g., 0.5 on a scale of 0-1). Alternatively, the scores for visual images for which AutoHint feedback has not been provided can be determined as a function of the degree of similarity between that visual image and an AutoHint image, e.g., a visual image that has a high degree of similarity to an AutoHint image that has been indicated to be good can be assigned a score that is just below 1.0, such as 0.9 or 0.95. If the invention is implemented to enable a viewer to identify AutoHint clips(s), visual images of the visual recording can be assigned AutoHint scores in a similar manner: visual images within an AutoHint clip identified as good (as well visual images that are determined to be of sufficient similarity to such an AutoHint clip) can be assigned a maximum AutoHint score, visual images within an AutoHint clip identified as bad (as well visual images that are determined to be of sufficient similarity to such an AutoHint clip) can be assigned a minimum AutoHint score, and all other visual images can be assigned an intermediate AutoHint score (or a score that is a function of the degree of similarity between that visual image and an AutoHint clip.

As indicated above, any appropriate user interface can be used to enable provision of an AutoHint by a viewer. In general, the user interface of any apparatus used to view a visual recording can be modified to enable provision of AutoHint feedback. In particular, the user interface of consumer electronics equipment used for that purpose (e.g., television, DVD player or recorder, VCR, combo player,) can be modified to enable provision of AutoHint feedback. The user interface of a computer can also be modified to enable provision of AutoHint feedback. A user interface can be implemented, for example, to present one or more menu screens that allow a viewer to navigate through a number of visual images extracted from the visual recording (this can be done, for example, as described in commonly owned, co-pending U.S. patent application Ser. No. 10/198,007, entitled "Digital Visual Recording Content Indexing and Packaging," filed on Jul. 17, 2002, by Harold G. Sampson et al., the disclosure of which is hereby incorporated by reference herein) and label any or all of them as good or bad. The user interface can be implemented, for example, to enable a viewer to press UP (e.g., to indicate a good visual image) or DOWN (e.g., to indicate a bad visual image) keys on a remote control apparatus to indicate the viewer's AutoHint feedback. Or, for example, the user interface can be implemented to enable provision of AutoHint feedback using appropriate icons displayed on a display device (such as a "thumbs up" icon for a good visual image and/or a "thumbs down" icon for a bad visual image) that a viewer can select using appropriate apparatus, such as conventional "point-and-click" user input apparatus (e.g., mouse, pen and tablet).

In one embodiment of the invention including the capability of providing AutoHint feedback, an AutoHint interface is presented as a slide show with a pleasant musical background. Visual images (e.g., keyframe(s), "snapshot(s)" and/or "mechanically" selected images) extracted from the visual recording are presented as individual slides in the slide show. The visual images can be presented in chronological order or the visual images can be presented at random. One or more viewers is enabled to provide AutoHint feedback regarding each visual image as the image is displayed. If more than one viewer provides AutoHint feedback, an AutoHint score can be determined as an average of the AutoHint scores produced by the AutoHint feedback of all of the viewers. An AutoHint interface implemented in this way can make the act of providing AutoHint feedback a fun and enjoyable experience, rather than a form of effort or work. In fact, the viewer(s) (e.g., family) watching the slide show may not even realize they are engaging in a form of semi-automated editing of the visual recording.

Figure 4:
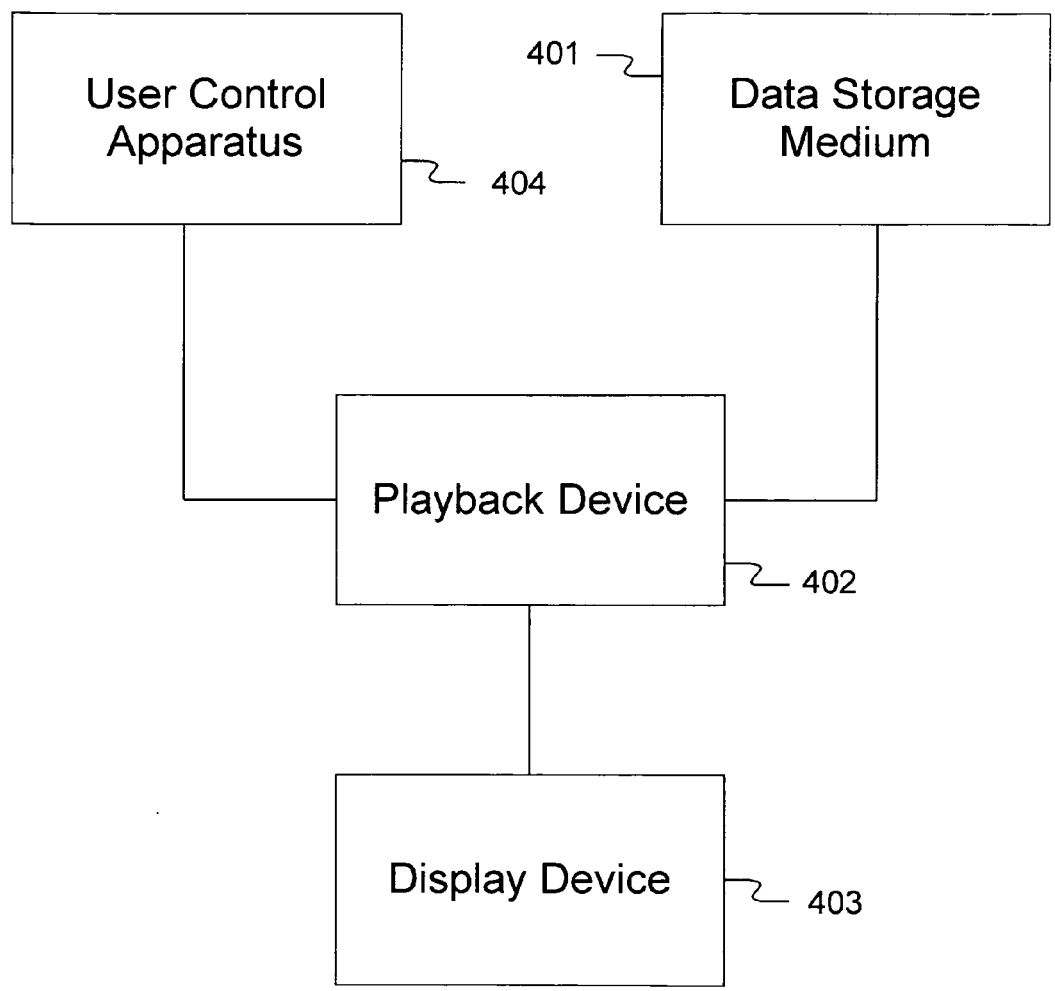
FIG. 4 is a block diagram illustrating components of a system in which the invention can be used.

FIG. 4 is a block diagram illustrating components of a system in which the invention can be used. The components of the system illustrated in FIG. 4 can be embodied by any appropriate apparatus, as will be understood by those skilled in the art in view of the description herein. Content data can be stored on data storage medium 401. The content data can include visual image data and/or audio data. Metadata can also be stored on the data storage medium 401. The data storage medium 401 can be embodied by any data storage apparatus. For example, the data storage medium 401 can be embodied by a portable data storage medium or media, such as one or more DVDs, one or more CDs, one or more video-tapes, or one or more optical disks. The data storage medium 401 can also be embodied by data storage apparatus that are not portable (in addition to, or instead of, portable data storage medium or media), such as a hard drive (hard disk) or digital memory, which can be part of, for example, a desktop computer or personal video recorder (PVR). Further, the content data can be stored on the data storage medium 401 in any manner (e.g., in any format). A playback device 402 causes content data (some or all of which, as indicated above, can be stored on the data storage medium 401) to be used to produce a visual or audiovisual display on a display device 403. When some or all of the content data is stored on a portable data storage medium or media, the playback device 402 is constructed so that a portable data storage medium can be inserted into the playback device 402. The playback device 402 can be embodied by, for example, a conventional DVD player or recorder, CD player, combination DVD/CD player, or computer including a CD and/or DVD drive. The playback device 402 can have included or associated therewith data recording apparatus for causing data to be stored on a portable data storage medium (e.g., a CD or DVD "burner" for storing content data representing a visual recording summary on a CD or DVD). The display device 403 can be embodied by, for example, a television or a computer display monitor or screen. A user control apparatus 404 is used to control operation of the playback device 402 and visual display device 403. The user control apparatus 404 can be embodied by, for example, a remote control device (e.g., a conventional remote control device used to control a DVD player or recorder, CD player or combination DVD/CD player), control buttons on the playback device 402 and/or visual display device 403, or a mouse (or other pointing device). As described in more detail elsewhere herein, the user control apparatus 404 and/or the playback device 102 (or processing device(s) associated therewith) can also be used to cause a visual recording summary according to the invention to be created. A system according to the invention for creating a visual recording summary can be implemented using the data processing, data storage and user interface capabilities of the components of the system of FIG. 4, as can be appreciated in view of the description herein.

The invention can advantageously be used, for example, with a home theater system. A home theater system typically includes a television and a digital video playback device, such as a DVD player or a digital PVR. A PVR (such as a Tivo™ or Replay™ device) typically contains a hard drive, video inputs and video encoding capabilities. The digital video playback device can be enhanced with software that reads metadata encoded on a digital data storage medium, which can be useful with some embodiments of the invention, as discussed elsewhere herein. The digital video playback device can also include data storage apparatus for storing one or more computer programs for creating a visual recording summary in accordance with the invention. The digital video playback device can include or have associated therewith a DVD or CD burner which can be used for storing data representing a visual recording summary after the summary has been created. The digital video playback device (or other apparatus of the home theater system) can also contain a network connection to the Internet or a local area network (LAN).

Although the invention can advantageously be used with a home theater system, the invention is not limited to use with that platform. A visual recording summary according to the invention can be created and/or displayed on any hardware platform that contains the appropriate devices. For example, the invention can be used with a personal computer, which often includes a video input (e.g., direct video input or a DVD drive), as well as a processor, a hard drive and a display device, and has associated therewith a DVD or CD burner.

The invention can also be used on an embedded platform, such as in DVD recorders, digital video recorders (DVRs), "combi drives" that include DVD recording capability and a hard disk, camcorders, video camera phones, or other hardware having similar platform constraints and characteristics.

The capability of producing a display of a visual recording summary in accordance with the invention can be provided to a user in a variety of ways. For example, a visual recording summary or summaries can be created as described above and stored on a data storage medium or media that is made accessible to the user. In particular, the visual recording summar(ies) can be stored on a portable data storage medium or media, such as one or more DVDs or CDs, that are provided to the user. The visual recording summar(ies) can also be stored at a site on a network which a user can access to obtain the visual recording summar(ies). Or, the visual recording summar(ies) can be provided to the user via a network, e.g., electronically mailed to the user. The visual recording summar(ies) can be provided in multiple resolutions. The original visual recording or visual recordings from which the visual summar(ies) are created, metadata regarding the visual recording(s) and/or computer program(s) that enable creation of visual recording summar(ies) from visual recording(s) can also be provided to the user together with the visual recording summar(ies) as described above, e.g., stored together with the visual recording summar(ies) on portable data storage medi(a) (e.g., one or more DVDs or CDs) that are provided to the user, stored at a network site which a user can access, or provided to the user via a network (, e.g., electronically mailed to the user).

Alternatively, metadata that can be used to create a visual recording summary is produced regarding one or more visual recordings from which a user desires to create one or more visual recording summar(ies), as well as, if applicable, non-source audio content that is to be used to accompany the visual recording summar(ies). Some or all of the metadata can be produced during acquisition of the visual recording(s) (or during processing of the visual recording(s), such as digitization, if applicable) or after acquisition (and, if applicable, digitization) of the visual recording(s). The metadata can include, for example, indices that identify clips in visual recording(s) to be included in visual recording summar(ies). Or, the metadata can include, for example, data regarding scene breaks, characteristic(s) of visual images and/or beats in music that can be used to select clips from visual recording(s) for inclusion in visual recording summar(ies). The metadata can be stored together with the visual recording(s) on data storage medi(a) that are made accessible to the user, such as one or more DVDs or CDs that are provided to the user. Or, the metadata can be stored at a site on a network which a user can access to obtain the metadata. Or, the metadata can be provided to the user via a network, e.g., electronically mailed to the user. In the latter two cases, the visual recording(s) can be provided to the user (if not already in the user's possession) by, for example, also making the visual recording(s) available at the network site or sending the visual recording(s) to the user via the network (e.g., by electronic mail), or by storing the visual recording(s) on portable data storage medi(a) (e.g., one or more DVDs or CDs) that are provided to the user. Apparatus and/or computer program(s) that enable creation of a visual recording summary using the provided metadata can already be possessed by the user. Or, if only appropriate apparatus is already possessed by the user, the computer program(s) that enable creation of a visual recording summary can be made available to the user, e.g., the computer program(s) can be stored together with the metadata and visual recording(s) on data storage medi(a) that are made accessible to the user, such as one or more DVDs or CDs that are provided to the user, or the computer program(s) can be made available via a network, either by making the computer program(s) available at a network site or by e-mailing the computer program(s) to the user. The computer program(s) for enabling creation of a visual recording summary can be implemented to enable the user to specify attributes of a visual recording summary, such as, for example, the duration of the visual recording summary, non-source audio content to be included with the visual recording summary, the duration of one or more clips (as well as, if applicable, the duration of display of one or more still visual images), the order of display of clips (and, if applicable, still visual images), and the transition style between a pair of clips (or, if applicable, between a clip and still visual image or two still visual images).

Instead of providing either visual recording summar(ies) or metadata to a user, the user can be provided computer program(s) that enable creation of one or more visual recording summaries from one or more visual recordings. For example, the computer program(s) can be provided to the user on a portable data storage medium or media, such as one or more DVDs or CDs. Or, for example, the computer program(s) can be made accessible via a network, such as the Internet. Or, the computer program(s) can be provided together with apparatus that enables, when operating in accordance with the computer program(s), creation of visual recording summar(ies) from visual recording(s). For instance, a DVD or CD player can be implemented to enable operation in accordance with such computer program(s) (which can be embodied in software or firmware pre-loaded on the player) to create visual recording summar(ies). The computer program(s) can enable all functions necessary or desirable for creation of a visual recording summary in accordance with the invention, including digitization of an analog visual recording, production of metadata from a visual recording (and, if applicable, from non-source audio content), and creation of a visual recording summary using the metadata. The computer program(s) can also enable the user to specify attributes of a visual recording summary (duration of the visual recording summary, transition styles, etc.), as discussed above.

The invention can be implemented, in whole or in part, by one or more computer programs and/or data structures, or as part of one or more computer programs and/or data structure(s), including instruction(s) and/or data for accomplishing the functions of the invention. The one or more computer programs and/or data structures can be implemented using software and/or firmware that is stored and operates on appropriate hardware (e.g., processor, memory). For example, such computer program(s) and/or data structure(s) can include instruction(s) and/or data, depending on the embodiment of the invention, for, among other things, digitizing content data, evaluating content data to produce metadata, identifying candidate clips, evaluating candidate clips (e.g., computing scores for candidate clips), selecting clips for inclusion in a visual recording summary, extracting clips from the visual recording, storing the visual recording summary and/or producing a display (including any special effects) of a visual recording summary. Those skilled in the art can readily implement the invention using one or more computer program(s) and/or data structure(s) in view of the description herein. Further, those skilled in the art can readily appreciate how to implement such computer program(s) and/or data structure(s) to enable execution on any of a variety of computational devices and/or using any of a variety of computational platforms.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A method for editing a visual recording stored on a data storage medium, comprising the steps of:
   evaluating data regarding the content of the visual recording and/or data regarding the manner in which the visual recording was obtained;
   selecting one or more clips of the visual recording to be included in a summary of the visual recording, based on the evaluation, wherein the selected clips of the visual recording comprise less than all of the visual recording, and wherein the step of selecting and/or the step of evaluating are performed, at least in part, automatically; and
   discarding parts of the visual recording not included in the visual recording summary so that the discarded parts of the visual recording are no longer stored on a data storage medium;
   modifying the result of the evaluation in accordance with an input provided by a viewer of the visual recording regarding the desirability of a part of the visual recording, wherein the step of selecting is based on the modified result of the evaluation;
   the step of modifying is implemented to modify the result of the evaluation in accordance with input provided by each of a plurality of viewers of the visual recording regarding the desirability of a part of the visual recording.

2. A method as in claim 1, further comprising the step of storing the visual recording summary on a data storage medium.

3. A method as in claim 2, wherein the data storage medium is a portable data storage medium.

4. A method as in claim 1, further comprising the step of specifying the duration of the visual recording summary.

5. A method as in claim 4, wherein the specified duration of the visual recording summary is greater than or equal to 75% of the duration of the original unsummarized visual recording.

6. A method as in claim 5, wherein the specified duration of the visual recording summary is greater than or equal to 50% of the duration of the original unsummarized visual recording.

7. A method as in claim 4, wherein the step of specifying the duration of the visual recording summary further comprises the step of choosing a music selection or selections to accompany the visual recording summary, wherein the duration of the visual recording summary is established in accordance with the duration of the music selection or selections.

8. A method as in claim 4, wherein the step of selecting comprises selecting only candidate clips that meet a specified criterion or criteria, such that the actual duration of the visual recording summary may be less than the specified duration of the visual recording summary.

9. A method as in claim 1, wherein the step of selecting comprises selecting all candidate clips that meet a specified criterion or criteria.

10. A method as in claim 1, wherein the step of evaluating comprises the steps of:
    identifying a plurality of candidate clips in the visual recording; and
    evaluating each of the candidate clips regarding the content of the clip and/or the manner in which the clip was obtained.

11. A method as in claim 10, wherein the evaluation of each candidate clip is based on an image stability criterion.

12. A method as in claim 10, wherein the evaluation of each candidate clip is based on an image saturation criterion.

13. A method as in claim 10, wherein the evaluation of each candidate clip is based on an edge sharpness criterion.

14. A method as in claim 10, wherein the evaluation of each candidate clip is based on an image contrast criterion.

15. A method as in claim 10, wherein the evaluation of each candidate clip is based on a garbage content criterion.

16. A method as in claim 10, wherein the evaluation of each candidate clip is based on a snapshot criterion.

17. A method as in claim 10, wherein the evaluation of each candidate clip is based on a front-loading criterion.

18. A method as in claim 10, wherein the evaluation of each candidate clip is based on an audio content criterion.

19. A method as in claim 10, wherein the evaluation of each candidate clip is based on a camera hints criterion.

20. A method as in claim 10, wherein the step of evaluating each of the candidate clips comprises the step of computing a score for each candidate clip based on the evaluation of the clip.

21. A method as in claim 10, wherein the evaluation of each candidate clip is based on multiple criteria.

22. A method as in claim 21, wherein the step of evaluating each of the candidate clips comprises the steps of:
    computing a sub-score for each criterion for each candidate clip based on an evaluation of the clip in accordance with the criterion; and
    combining the sub-scores for each candidate clip to produce an overall score for the candidate clip.

23. A method as in claim 1, further comprising the step of specifying the manner of display of the selected clips in accordance with a format template.

24. A method as in claim 1, implemented on a DVD recorder.

25. A method as in claim 1, implemented on a camcorder.

26. A method as in claim 1, implemented on a video camera phone.

27. A method as in claim 1, wherein the step of modifying further comprises:
    identifying a score for the input provided by each of the plurality of viewers regarding the desirability of the part of the visual recording; and
    combining the scores for the plurality of viewers to produce an aggregate score representing the desirability of the part of the visual recording to the plurality of viewers.

28. A method as in claim 27, wherein the step of combining further comprises averaging the scores for the plurality of viewers.

29. A method as in claim 1, further comprising the step of modifying the result of the evaluation in accordance with an input provided by a viewer of the visual recording, wherein the step of selecting is based on the modified result of the evaluation.

30. A method as in claim 29, wherein the input provided by the viewer of the visual recording concerns a part of the visual recording.

31. A method as in claim 30, wherein the part of the visual recording comprises a visual image of the visual recording.

32. A method as in claim 30, wherein the part of the visual recording comprises a clip of the visual recording.

33. A method as in claim 30, further comprising the steps of:
displaying a plurality of parts of the visual recording; and
monitoring a user input apparatus to identify input from the viewer regarding one of the plurality of parts of the visual recording.

34. A method as in claim 33, wherein the part of the visual recording which the input concerns comprises a part of the visual recording having a specified relationship to the part of the visual recording being viewed at the time that the input is provided.

35. A method as in claim 34, wherein the part of the visual recording which the input concerns comprises the part of the visual recording being viewed at the time that the input is provided.

36. A method as in claim 1, further comprising the step of selecting one or more clips of the visual recording to be included in a second summary of the visual recording comprising less than all of the visual recording.

37. A method as in claim 36, further comprising the step of discarding parts of the visual recording not included in the second visual recording summary so that the discarded parts of the visual recording are no longer stored on a data storage medium.

38. A method as in claim 36, wherein the first and second summaries are of different duration.

39. A method for viewing the first and second summaries of claim 38, wherein the duration of the second summary is shorter than the duration of the first summary, the method further comprising the steps of:
displaying the second summary;
monitoring a user input apparatus during display of the second summary to identify input from a viewer; and
displaying the first summary in accordance with an identified input from the viewer.

40. Apparatus for editing a visual recording stored on a data storage medium, comprising:
means for evaluating data regarding the content of the visual recording and/or data regarding the manner in which the visual recording was obtained;
means for selecting one or more clips of the visual recording to be included in a summary of the visual recording, based on the evaluation, wherein:
the selected clips of the visual recording comprise less than all of the visual recording;
the step of selecting and/or the step of evaluating are performed, at least in part, automatically; and
the parts of the visual recording not included in the visual recording summary are discarded so that the discarded parts of the visual recording are no longer stored on a data storage medium;
modifying the result of the evaluation in accordance with an input provided by a viewer of the visual recording regarding the desirability of a part of the visual recording, wherein the step of selecting is based on the modified result of the evaluation;
the step of modifying is implemented to modify the result of the evaluation in accordance with input provided by each of a plurality of viewers of the visual recording regarding the desirability of a part of the visual recording.

41. Apparatus as in claim 40, further comprising:
user input apparatus; and
means for modifying the result of the evaluation of data regarding the content of the visual recording and/or data regarding the manner in which the visual recording was obtained, in accordance with an input provided by a viewer of the visual recording using the user input apparatus, wherein the selection of one or more clips of the visual recording to be included in a summary of the visual recording is based on the modified result of the evaluation.

42. A camcorder comprising apparatus as in claim 40.

43. A video camera phone comprising apparatus as in claim 40.

44. A computer readable-storage medium or media encoded with one or more computer programs for editing a visual recording stored on a data storage medium, the one or more computer programs comprising:
instructions for evaluating data regarding the content of the visual recording and/or data regarding the manner in which the visual recording was obtained;
instructions for selecting one or more clips of the visual recording to be included in a summary of the visual recording, based on the evaluation, wherein:
the selected clips of the visual recording comprise less than all of the visual recording;
the step of selecting and/or the step of evaluating are performed, at least in part, automatically; and
the parts, of the visual recording not included in the visual recording summary are discarded so that the discarded parts of the visual recording are no longer stored on a data storage medium;
modifying the result of the evaluation in accordance with an input provided by a viewer of the visual recording regarding the desirability of a part of the visual recording, wherein the step of selecting is based on the modified result of the evaluation;
the step of modifying is implemented to modify the result of the evaluation in accordance with input provided by each of a plurality of viewers of the visual recording regarding the desirability of a part of the visual recording.

* * * * *